US011158016B2

(12) United States Patent
Varga et al.

(10) Patent No.: US 11,158,016 B2
(45) Date of Patent: Oct. 26, 2021

(54) CUSTOMIZED CAREER COUNSELING AND MANAGEMENT

(71) Applicant: International Business Machines Corporation, Armonk, NY (US)

(72) Inventors: Sergio Varga, Campinas (BR); Marco Aurelio Stelmar Netto, Sao Paulo (BR); Daniela Trevisan, Porto Alegre (BR); Yankel Schwartz, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 16/358,870

(22) Filed: Mar. 20, 2019

(65) Prior Publication Data

US 2020/0302564 A1 Sep. 24, 2020

(51) Int. Cl.
*G06Q 50/20* (2012.01)
*G06F 16/2457* (2019.01)
(Continued)

(52) U.S. Cl.
CPC ..... *G06Q 50/205* (2013.01); *G06F 16/24578* (2019.01); *G06N 5/02* (2013.01);
(Continued)

(58) Field of Classification Search
CPC ............. G06Q 50/2057; G06Q 50/205; G06Q 10/1053; G06Q 10/105; G06F 16/24578; G06N 5/02
See application file for complete search history.

(56) References Cited

U.S. PATENT DOCUMENTS 6,577,329 B1 * 6/2003 Flickner .................. G06F 3/013
715/774
9,468,852 B2 10/2016 Brown
(Continued)

FOREIGN PATENT DOCUMENTS

CN 108108910 A 6/2018
WO 20151474081 A1 10/2015

OTHER PUBLICATIONS

B. Patel, V. Kakuste and M. Eirinaki, "CaPaR: A Career Path Recommendation Framework," 2017 IEEE Third International Conference on Big Data Computing Service and Applications (BigDataService), 2017, pp. 23-30, doi: 10.1109/BigDataService. 2017.31 (Year: 2017).*

(Continued)

*Primary Examiner* — Gabrielle A Mccormick
*Assistant Examiner* — Maame Ofori-Awuah
(74) *Attorney, Agent, or Firm* — Schmeiser, Olsen & Watts, LLP; Christopher Pignato

(57) ABSTRACT

Systems, methods, and computer program products leveraging the use of data collection, analytics and predictive modeling to selectively provide customized career and education counseling based on each individual user's interests, personality, preferences, geographic location, habits and experiences. The collected user data and user-defined parameters define a user profile, providing insight into career or educational options best suited to the user. Further educational and career information may be collected and presented to the user, including enrollment information from one or more colleges and universities, specific educational programs aligned with the user's defined profile, and descriptions of courses and curriculum. The presentation of the career and educational information to the user may be tracked using a recording device and the reaction of the user while viewing the presented content may be used to gauge (Continued)

user interest in the presented materials and as feedback to improve future recommendations and presentations of materials.

20 Claims, 9 Drawing Sheets

(51) Int. Cl.
*G06N 5/02* (2006.01)
*G06Q 10/10* (2012.01)

(52) U.S. Cl.
CPC ....... *G06Q 50/2057* (2013.01); *G06Q 10/105* (2013.01); *G06Q 10/1053* (2013.01)

(56) References Cited

U.S. PATENT DOCUMENTS

| | | |
|---|---|---|
| 9,558,271 B1* | 1/2017 | Sathe .................... G06F 16/367 |
| 9,747,384 B1 | 8/2017 | Rao |
| 2004/0219493 A1* | 11/2004 | Phillips .................... G09B 5/06 434/118 |
| 2006/0195335 A1 | 8/2006 | Christian |
| 2011/0015497 A1 | 1/2011 | Eggenberger |
| 2013/0108997 A1* | 5/2013 | Wright ............... G06Q 30/0203 434/236 |
| 2014/0089219 A1 | 3/2014 | Matthews |
| 2015/0066559 A1 | 3/2015 | Brouwer |
| 2015/0248641 A1* | 9/2015 | Bastide .................. G06Q 50/01 705/328 |
| 2016/0012538 A1 | 1/2016 | Costaceque-Cecchi-Dimeglio |
| 2016/0117942 A1 | 4/2016 | Marino |
| 2016/0132607 A1* | 5/2016 | Skatell ................ G06F 16/3326 707/734 |
| 2017/0140488 A1 | 5/2017 | Caines |
| 2017/0185606 A1 | 6/2017 | Dirienzo |
| 2017/0236095 A1* | 8/2017 | Schreiber .............. G06F 3/0482 705/321 |
| 2017/0278208 A1 | 9/2017 | Oni |
| 2017/0333796 A1 | 11/2017 | Do |
| 2019/0188591 A1* | 6/2019 | Kao ......................... G06N 3/08 |

OTHER PUBLICATIONS

Patel et al. "CaPaR: A Career Path Recommendation Framework", 2017 IEEE Third International Conference on Big Data Computing Service and Applications, 978-1-5090-6318-5/17 © 2017 IEEE DOI 10.1109/BigDataService.2017.31, 30 pages.

"College and Career Guidance and Counseling", Last Modified: Oct. 16, 2007, 3 pages, <https://www2.ed.gov/print/about/offices/list/ovae/pi/cte/guidcoun2.html>.

* cited by examiner

US 11,158,016 B2

CUSTOMIZED CAREER COUNSELING AND MANAGEMENT

TECHNICAL FIELD

The present disclosure relates generally to the field of analytics and more specifically to the field of predictive modeling.

BACKGROUND

The field of data analytics can be described as the discovery, interpretation and communication of meaningful patterns in one or more data sets. The field of analytics can encompass a multidimensional use of fields including the use of mathematics, statistics, predictive modeling and machine learning techniques to find the meaningful patterns and knowledge in the collected data. Analytics can turn the collection of raw data into insight which can be applied to make smarter, better and more informed decisions based on the patterns identified by analyzing the collected sets of data.

Predictive modeling may be referred to as a process through which a future outcome or behavior can be predicted based on known results. A predictive model is able to learn how different data points connect with and/or influence one another in order to evaluate future trends. The two most widely used predictive models are regression and neural networks. Regression refers to linear relationships between the input and output variables, whereas neural networks are useful for handling non-linear data relationships. Predictive modeling works by collecting and processing historical data, creating a statistical model comprising a set of predictors or known features and applying one or more probabilistic techniques to predict a likely outcome using the predictive model.

SUMMARY

A first embodiment of the present disclosure provides a computer-implemented method comprising: receiving a knowledge base comprising a plurality of records, with each record respectively including: (i) an identity of a vocational action; and a plurality of parameter value ranges associated with the vocational action; receiving a user data set including information indicative of: (i) an identity of a user, and (ii) a plurality of pieces of information relating to the user; generating a plurality of user parameter values respectively corresponding to a plurality of parameters based, at least in part, upon the user data set; determining a selected set of record(s) in the knowledge base that match the user based, at least in part, upon a comparison between (i) the parameter values of the user, and (ii) the pluralities of parameter ranges of the records of the knowledge base; and outputting, to the user, the vocational actions(s) respectively corresponding to the selected set of record(s).

A second embodiment of the present disclosure provides a computer program product comprising: a storage medium; and computer code stored on the storage medium, with the computer code including instruction and data for causing a processor(s) set to perform at least the following operations: receiving a knowledge base comprising a plurality of records, with each record respectively including: (i) an identity of a vocational action; and a plurality of parameter value ranges associated with the vocational action, receiving a user data set including information indicative of: (i) an identity of a user, and (ii) a plurality of pieces of information relating to the user, generating a plurality of user parameter values respectively corresponding to a plurality of parameters based, at least in part, upon the user data set, determining a selected set of record(s) in the knowledge base that match the user based, at least in part, upon a comparison between (i) the parameter values of the user, and (ii) the pluralities of parameter ranges of the records of the knowledge base, and outputting, to the user, the vocational actions(s) respectively corresponding to the selected set of record(s).

A third embodiment of the present disclosure provides a computer system comprising: a processor(s) set; a storage medium; and computer code stored on storage medium, with the computer code including instruction and data for causing the processor(s) set to perform at least the following operations: receiving a knowledge base comprising a plurality of records, with each record respectively including: (i) an identity of a vocational action; and a plurality of parameter value ranges associated with the vocational action, receiving a user data set including information indicative of: (i) an identity of a user, and (ii) a plurality of pieces of information relating to the user, generating a plurality of user parameter values respectively corresponding to a plurality of parameters based, at least in part, upon the user data set, determining a selected set of record(s) in the knowledge base that match the user based, at least in part, upon a comparison between (i) the parameter values of the user, and (ii) the pluralities of parameter ranges of the records of the knowledge base, and outputting, to the user, the vocational actions(s) respectively corresponding to the selected set of record(s).

BRIEF DESCRIPTION OF THE DRAWINGS

FIG. 5b illustrates the further manipulation of the embodiment of the user interface depicted in FIG. 5a.

FIG. 6b depicts a flow diagram that is a continuation of the computerized method of FIG. 6a.

DETAILED DESCRIPTION

Overview

Figure 1:
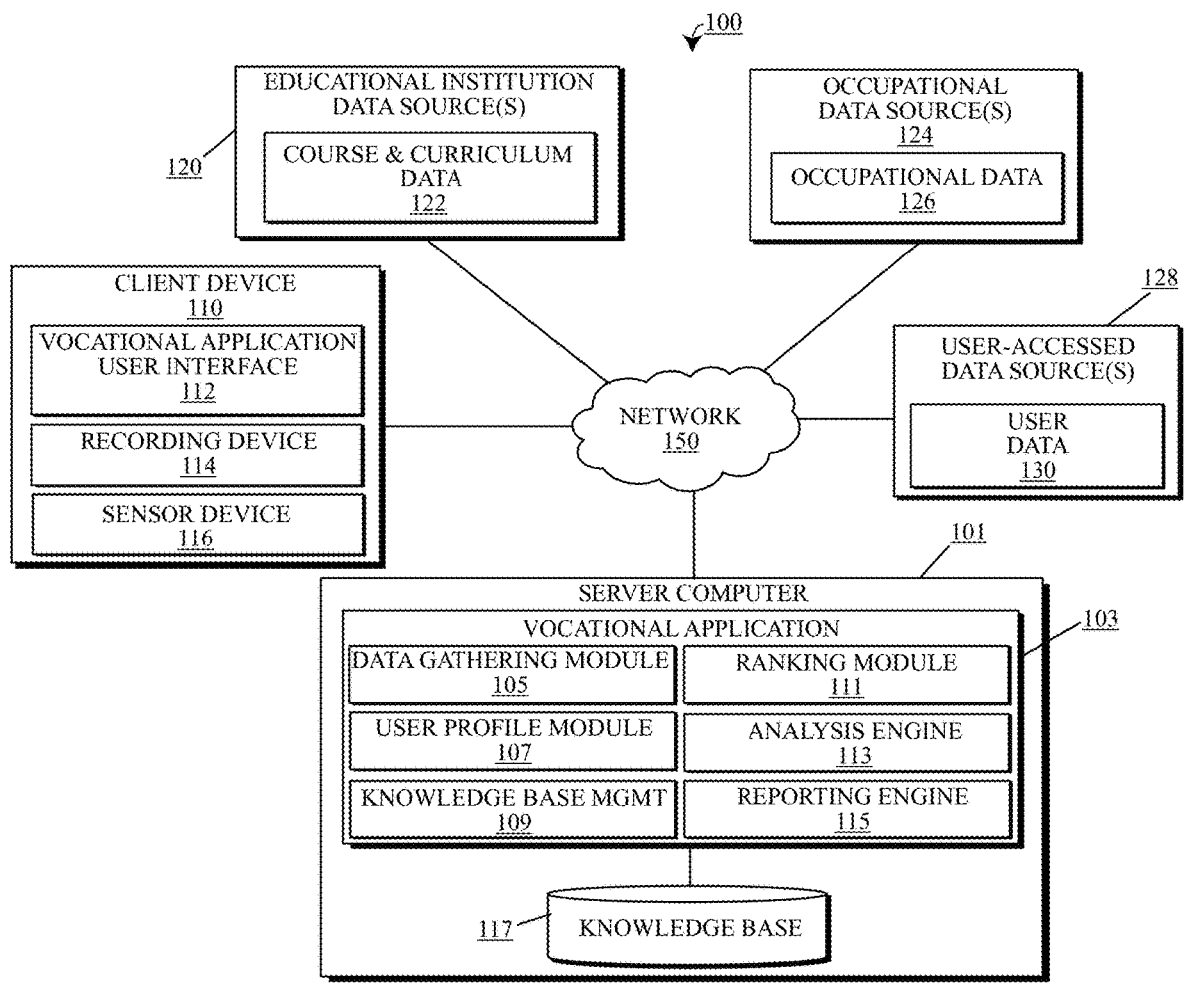
FIG. 1 depicts a functional block diagram describing an embodiment of a computing environment in accordance with the present disclosure.

Traditionally, students and individuals who complete high school, college or are seeking to change careers later in life, are often faced with making difficult choices about the student or individual's future endeavors. These choices can often include deciding on a future career, whether to continue academically toward higher education opportunities, selecting higher education programs and universities to attend, apprenticeships, fellowships, joining the military, attending a trade school, entering the workforce, opening a new business or selecting from among any other of the nearly infinite careers, vocations and educational paths that are available. Individuals tasked with making choices about their future endeavors may lack knowledge about the existence of potential choices that may be available, current market needs, or not fully understand which options match best with the individual's interests, personality and preferences.

Selecting a future career or making higher education decisions can be a daunting task and some individuals may have limited access to career advising resources or counseling services. Embodiments of the present disclosure may offer supplemental guidance to existing career services, guidance counselors, parental advice and other resources, to provide students and other individuals with an additional resource for more clearly understanding career, vocation, and educational possibilities. Embodiments of the present disclosure may be beneficial for researching career, vocational and educational opportunities before seeking further assistance from teachers, parents, guidance counselors or career advisers in some instances, allowing an individual to be better prepared for a discussion with people who may assist the individual further. In other instances, embodiments of the present disclosure may enhance and expand discussions between the individuals, parents, teachers and other counseling providers by informing the individual prior to career, vocational and education discussions about the options that may be available. A need exists for systems, methods and products that can further assist students and other individuals seeking career, vocation, and education advice, enhances the counseling capabilities of parents and education professionals and offer insight to help individuals make smart, informed decisions that align best with the individual's strengths, personality and interests.

Embodiments of the present disclosure describe systems, methods, and computer program products that leverage the use of data collection, analytics and predictive modeling to selectively provide customized career, vocation and education counseling based on each individual user's interests, personality, preferences, habits and experiences. Embodiments of the present disclosure are able to track and gather information describing each user based on the user's computerized activity, user-defined parameters and direct input by the user to create a user data set. For example, the disclosed systems, methods and program products can gather user data from a user's browser history, emails, messenger service data, social network activity, applications, text messaging services, geographic location services, cultural or community events attended, and other forms of available user data known or used by a person skilled in the art. The user data set may include information indicative of the identity of the user and a plurality of pieces of information relating to the user. From the user data set, a plurality of user parameter values can be generated that may describe the characteristics, interests, features, strengths and personality of the user.

Users may selectively opt-in to the data collection process, pick and choose which types of data may be gathered, and set permissions for the various types of data to be collected. User's participating in data collection may opt-in to receive notifications each time data is collected from the user and/or receive disclosure notifications that inform the user when certain types of data are collected, how the different types of collected data may be used and/or any third parties that may have access to the collected data. In some embodiments, users may be provided with data collection disclosures prior to providing permission for data collection. Examples of information included in the disclosure may comprise descriptions of the types of data collected, how different types of data may be used. Access to the collected data may be strictly controlled and maintained in strict compliance with all privacy laws that may be applicable.

Embodiments of the present disclosure may analyze the user data set comprising information and user data collected from one or more of the user's computerized devices in order to more fully understand each individual user's interests, personality, habits, experiences, user-defined parameters, geographic location or other defining characteristics that may be useful for characterizing the user and predicting a potential vocations, educational path or career path that might interest the user (referred to herein as "vocational actions") which may be organized by the type of vocational action being recommended. For example, employment type (i.e. specific careers and vocation being recommended), internship/volunteer type, education type (i.e. recommended courses and programs), licensing type (i.e. recommended licensing credentials to obtain for a particular employment type), social type (i.e. clubs, hobbies, groups, etc.), travel type and/or places-to-live type (i.e. locations or areas recommended to the user that may offer opportunities for engaging in a particular vocational action, such as education or employment).

Embodiments of the disclosure may identify a correlation between the collected user data set and historically collected user information from other users having similar interests, personalities, habits and experiences. Based on the correlation between the current user data set being analyzed and historical data, a user profile may be defined, which may include a plurality of user parameter values describing the user and the user data set. Embodiments of the disclosure may further use the defined user profile in conjunction with a knowledge base of historical data to further identify one or more vocations, educational programs or career paths that may be most interesting to the user based on the defined user profile. For each of the career, vocation or educational paths identified by the embodiments of the present disclosure, additional information and materials may be retrieved which can be presented to the user to assist with making a decision about the user's future vocation, career path or education. Embodiments of the present disclosure may retrieve career, vocational and/or educational information (referred to herein together as "vocational data") from one or more data sources maintaining the career, vocation and/or educational information. Examples of career, or vocational information can include job descriptions, job requirements, potential employers, salary information, education requirements, licensing requirements, various specialty fields or sub-fields within a particular profession, or any other information that may be useful for understanding a vocation or education associated with practicing the vocation.

Embodiments of the present disclosure may further gather educational information for presentation to a user, which may be relevant to a career or vocation that that aligns within an identified user's profile. Educational information may be retrieved from one or more data sources including educational institutions, universities, colleges, professional associations, trade unions, governmental web sites, non-profit institutions and/or other network accessible data sources. Embodiments of the educational information may include images, text, videos, audio or other multimedia elements that may introduce a user to one or more careers, vocations or educational programs that coincide with career or vocational action being identified as suitable for a particular user based on the user data gathered and user-defined parameters of the user's profile. Educational information being presented to the user may describe the one or more educational type of vocational action the user may be interested in pursuing, including programs provided by or affiliated with the educational institution in detail, including course requirements, course curriculum, entry requirements for a particular program, acceptance rates into a program, median acceptance criteria for a program, GPA requirements, SAT, ACT or other standardized testing requirements, cost of the program, financial aid information, scholarship availability, and other useful information or descriptions that may assist a user with making an informed decision about applying for or attending the described educational institution.

Embodiments of the present disclosure may apply predictive modeling techniques to rank vocational actions that may be pursued by the user, including career, vocational, educational, volunteer, geographical, and social options for the user based on the predicted likelihood that a recommended career, vocational and/or educational option (referred to herein collectively as "vocational action") would be found interesting to the user receiving the recommendations and vocational data. The ranked vocational action, along with corresponding vocational data may be compiled into a report and/or presented to the user using an interactive user interface. As the user views each of the presented vocational actions along with the corresponding vocational data, the embodiments of the present disclosure may track the user's response or reaction while viewing the vocational action and accompanying data to determine whether or not the presented information is interesting or uninteresting to the user.

Embodiments of the present disclosure may track each user's response to the presented vocational action through feedback recorded by a sensor device or a recording device such as an imaging device, camera, audio collection device, microphone, an internet-of-things (IOT) device such as a wearable device (i.e. smart watch or glasses) or any other instrument or apparatus that may be capable of collecting additional feedback data describing the user's response. For example, recording devices such as a biometric camera can detect a user's interest based on facial expressions, while sensor devices can detect interest based on physiological signs of excitement, and audio collection devices can detect interest based on changes in speech or vocal patterns. Collecting additional indications of a user's excitement, interest or disinterest while viewing the generated report describing, in detail, each of the recommended career options and/or educational options or other types of vocational actions a user could pursue, may provide feedback to the embodiments of the present disclosure, allow for refinements to the predictive analysis of the vocational actions presented to the user, expand the knowledge base used to make the recommendations of each vocational option and improve predictions by the disclosed embodiments for both the user providing the feedback as well as future users who may use the disclosed embodiments for career or education counseling.

System for Dynamic Career and Education Counseling

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1-5*b* depict diagrams of a computing environment 100, 200, 400 capable of generating customized vocational actions, including career and educational guidance which may provide, present and/or recommend career, vocational and educational options to a user based on each user's interests, activities, preferences, and behaviors. Embodiments of computing environment 100, 200, 400 may include a plurality of computer systems and devices interconnected via a computer network 150, such as a server computer 101, client device 110, and one or more computer systems 700 maintaining one or more data sources, including user-accessed data source(s) 128, occupational data source(s) 124 and educational institution data source(s) 120 (referred to herein collectively as "data sources 120, 124, 128").

Figure 7:
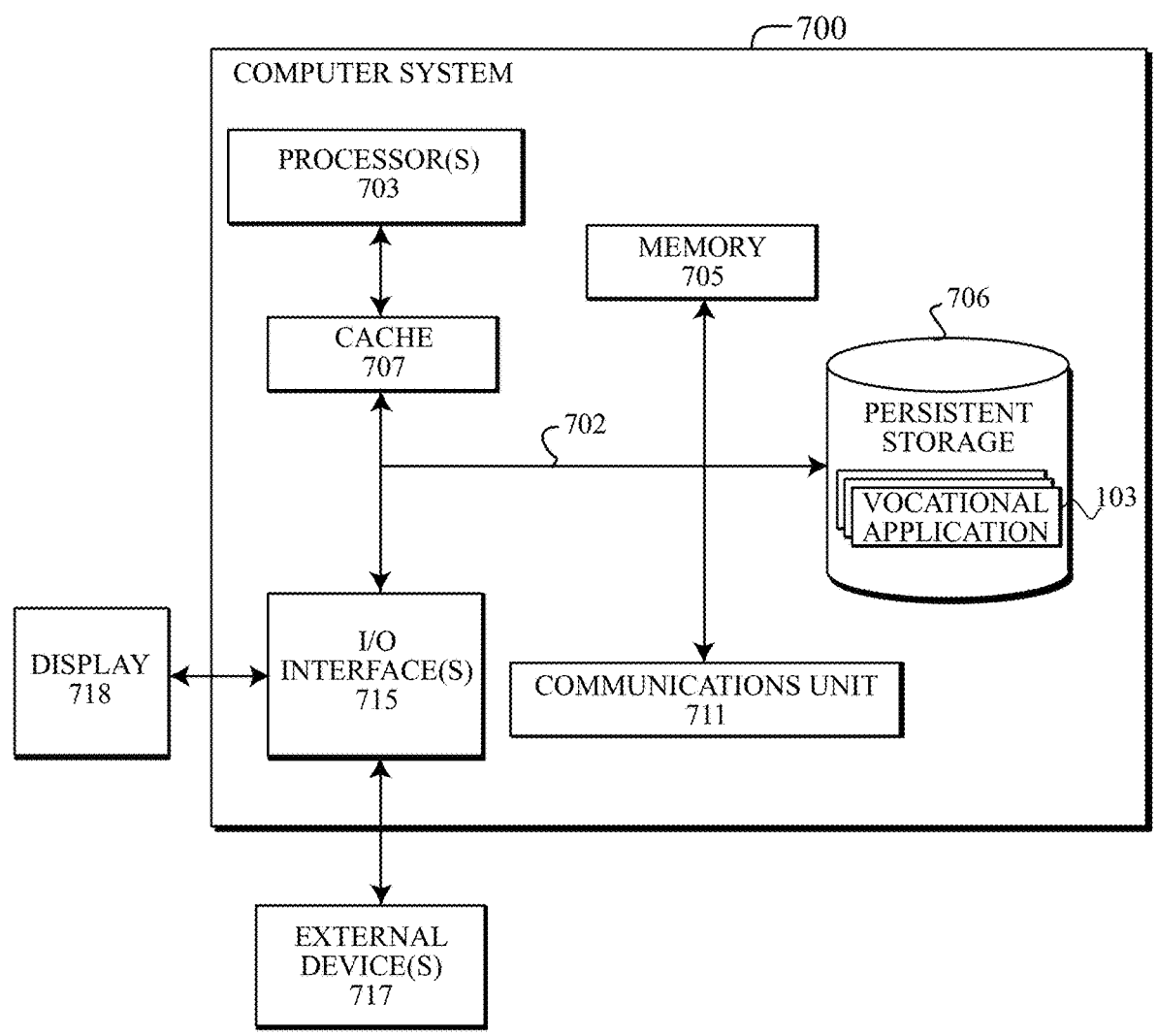
FIG. 7 depicts an embodiment of a block diagram of internal and external components of a computer system in accordance with the embodiments of the present disclosure.

Server computer 101, client device 110, data sources 120, 124, 128, and network accessible systems such as network accessible repositories or additional network-enabled computer systems 700, may each be a specialized computer system comprising specialized configurations of hardware, software or a combination thereof, as shown and described in FIGS. 1-5*b* of the present disclosure and in embodiments described herein. Embodiments of the server computer 101, client device 110, data sources 120, 124, 128 and other network accessible systems, may not only comprise the elements of the systems and devices depicted in FIGS. 1-5*b*, but may also incorporate one or more elements of a computer system 700, as shown in FIG. 7 and described in the COMPUTER SYSTEM section below. One or more components of the computer system 700 may be integrated into each of the specialized computer systems of computing environment 100, 200, 400, including the integration of one or more processor(s) 703, memory 705, persistent storage 706, cache 707, communications unit 711, I/O interface(s) 715, external device(s) and/or human-readable display(s) 718.

Embodiments of the server computer 101, client device 110, data sources 120, 124, 128, and other network accessible systems, may be desktop computers, laptop computers, tablet computers, smartphones, network enabled IOT devices, wearable computing devices, servers, or any other type of computer system known by persons skilled in the art. In some embodiments, server computer 101, client device 110, data sources 120, 124, 128, and other network accessible systems, may represent computer systems utilizing clustered computers and components to act as a single pool of seamless resources when accessed through network 150. For example, such embodiments may be used in a data center, cloud computing environment 200, storage area network (SAN), and network attached storage (NAS) applications. In certain embodiments, server computer 101, client device 110, data sources 120, 124, 128, and other network accessible systems may represent virtual machines provisioned by a host computer on the network 150. For example, server computer 101 hosting a plurality of virtual machines accessing the vocational application 103 being hosted by the server computer 101. In general, server computer 101, client device 110, data sources 120, 124, 128, and other network accessible systems may be representative of any electronic devices, or combination of electronic devices, capable of executing machine-readable program instructions, as described in greater detail with regard to FIGS. 6a-6b below.

Embodiments of the server computer 101, client device 110, data sources 120, 124, 128, and other network accessible systems, may each be connected and placed into communication with one another over a computer network 150. Embodiments of the computer network 150 may be constructed using wired, wireless or fiber optic connections. As shown in the exemplary embodiments, server computer 101, client device 110, data sources 120, 124, 128 and other network accessible systems may connect and communicate over the network 150 using a communications unit 711, such as a network interface controller or other network communication hardware. Embodiments of the communications unit 711 may implement specialized electronic circuitry allowing for communication using a specific physical layer and a data link layer standard. For example, Ethernet, Fiber channel, Wi-Fi or Token Ring. Communications unit 711 may further allow for a full network protocol stack, enabling communication over network 150 to the group of computer systems or other computing hardware devices linked together through the communication channels. The network 150 may facilitate communication and resource sharing among the server computer 101, client device 110, data sources 120, 124, 128, and other network accessible systems connected to the network 150. Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing is a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 200 is service oriented with a focus on statelessness, low coupling, modularity, and semantic interoperability. At the heart of cloud computing is an infrastructure that includes a network of interconnected nodes.

Figure 2:
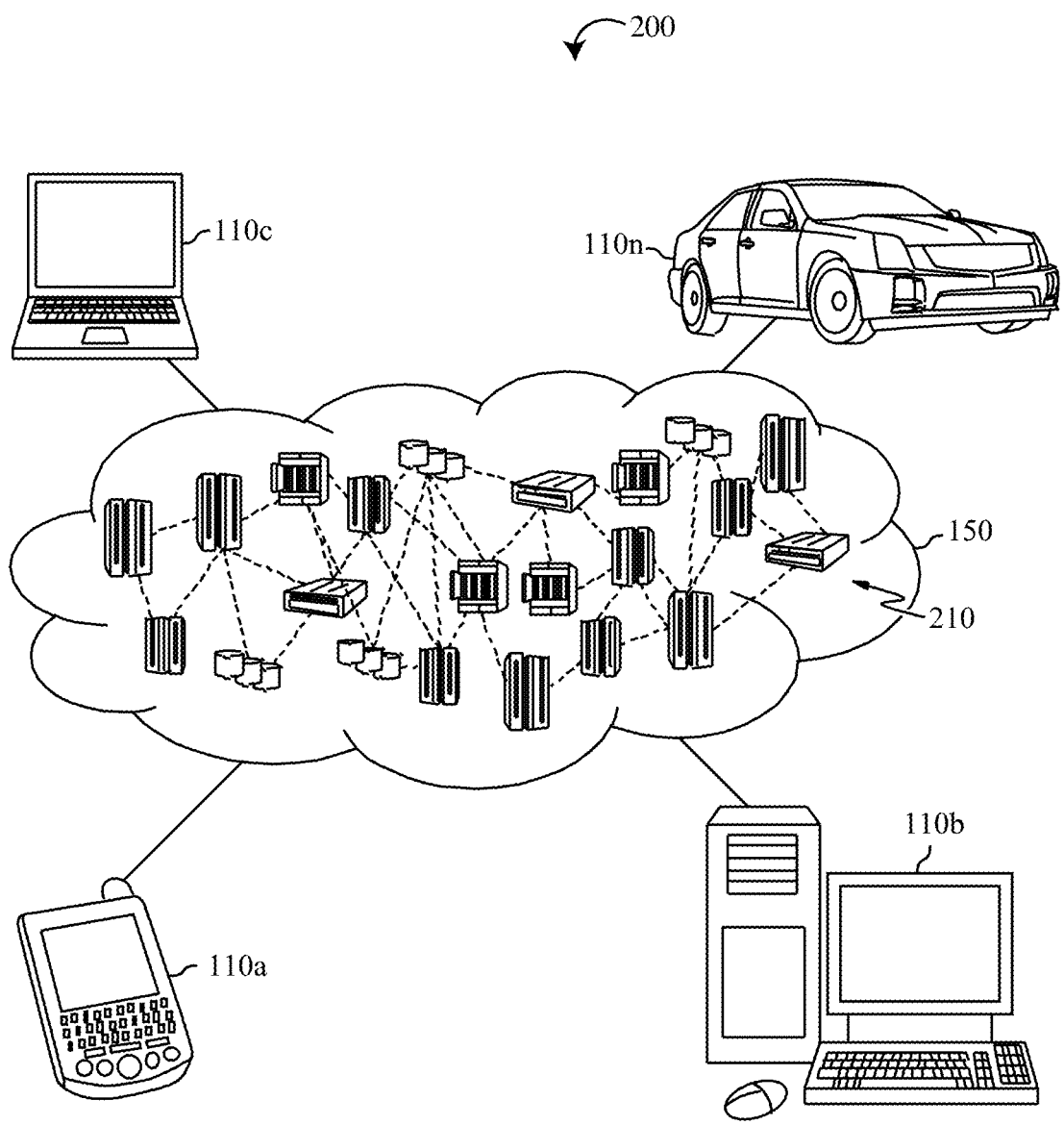
FIG. 2 depicts an embodiment of a cloud computing environment in accordance with the present disclosure.

Referring to the drawings, FIG. 2 is an illustrative example of a cloud computing environment 200. As shown, cloud computing environment 200 includes one or more cloud computing nodes 210 with which client devices 110 operated by cloud consumers may communicate, such as, for example, smartphone or cellular telephone 110a, desktop computer 110b, laptop computer 110c, and/or any other unconventional computing or IOT device, such as an automobile computer system 110n. Nodes 210 may communicate with one another and may be grouped (not shown) physically or virtually, in one or more networks, such as Private, Community, Public, or Hybrid clouds as described hereinabove, or a combination thereof. This may allow cloud computing environment 200 to offer infrastructure, platforms and/or software as services for which a cloud consumer does not need to maintain resources locally on a client device 110. It is understood that the types of client devices 110 shown in FIG. 2 are intended to be illustrative only and that computing nodes 210 and cloud computing environment 200 can communicate with any type of computerized device over any type of network and/or network addressable connection (e.g., using a web browser).

Figure 3:
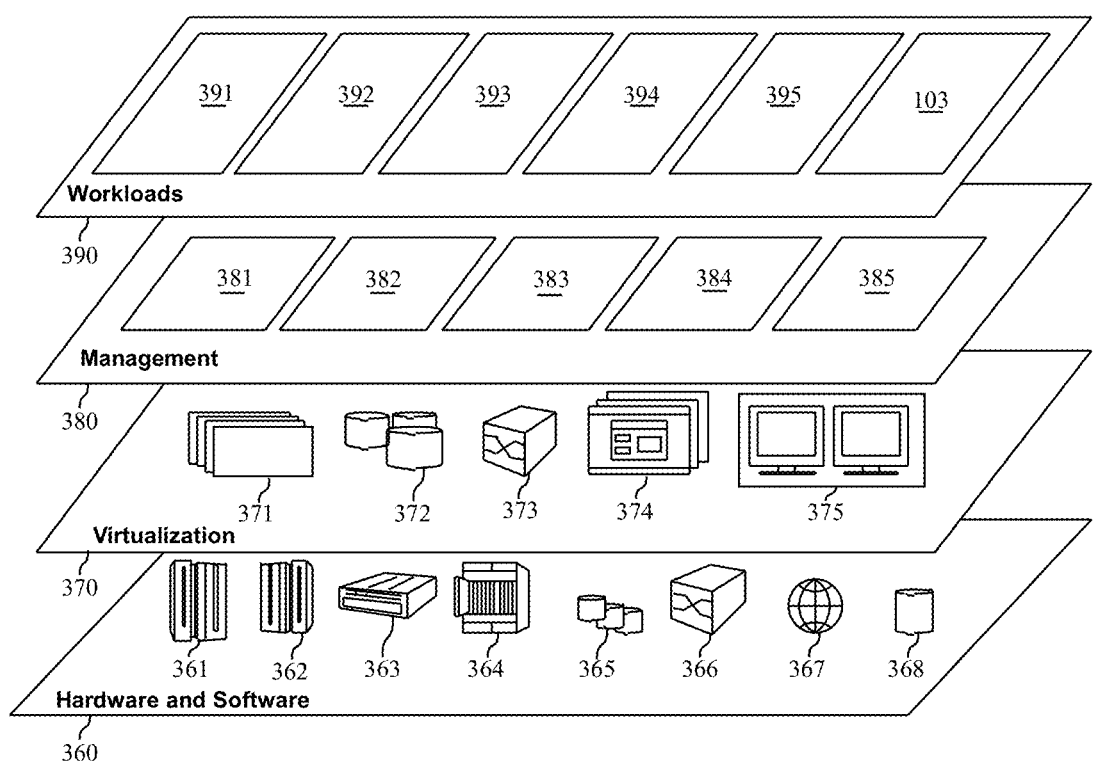
FIG. 3 depicts an embodiment of abstraction model layers of a cloud computing environment in accordance with the present disclosure.

Referring now to FIG. 3, a set of functional abstraction layers provided by cloud computing environment 200 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 may comprise hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment 200. Metering and pricing 382 provide cost tracking as resources are utilized within the cloud computing environment 200, and billing or invoicing for consumption of these resources. In one example, these resources can include application software licenses. Security provides identity verification for cloud consumers and tasks, as well as protection for data and other resources. User portal 383 provides access to the cloud computing environment 200 for cloud consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: machine learning 391 engines; software development and lifecycle management 392; data curation 393; data analytics processing 394; report processing 395 and vocational application 103.

Embodiments of the computing environments 100, 200, 400 may include a server computer 101 or any other type of computer system 700 capable of performing one or more tasks or functions associated with creating, modifying, updating, deleting and/or presenting educational or career guidance that can be customized based on the user profiles of one or more users interacting with the server computer 101, as described in detail throughout this disclosure. Embodiments of a server computer 101 may refer to a computer, device or a program that may be dedicated to managing network 150 resources. A server computer 101 may include a computer program or application that provides a service to other computers or computer programs (and users thereof) connecting to the server computer 101 via a network 150. Examples of server computers 101 may include a web server, application server, mail server, virtual server, file server, etc. In the exemplary embodiment of FIG. 1, the server computer 101 may be loaded with a vocational application 103 that provides services comprising the generation of customized education and career guidance, recommendations and information to users based on individual user profiles and presents a generated report or interactive report via a user interface, to each client device(s) 110 accessing the vocational application 103.

Embodiments of the vocational application 103 may be loaded into the persistent storage 706 or other computer readable storage media accessible to the server computer 101, either locally or via network 150. Embodiments of the server computer 101 may include one or more processes, services, engines and/or modules specializing in performing one or more specific tasks associated with creating, maintaining, updating and/or presenting vocational action to users accessing the vocational application 103. The term "module" may refer to a hardware module, a software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 705 devices and/or persistent storage 706 devices. A software-based module may be part of a program, program code or linked to program code containing specific programmed instructions loaded into a memory 705 device or persistent storage 706 device of a computer system 700, such as the server computer 101, operating in computing environment 100, 200, 400.

Referring to the drawings, FIG. 1 depicts an exemplary embodiment of computing environment 100, which may comprise a server computer 101 and client device 110 connected to a network 150 as shown. Embodiments of the server computer 101 may provide educational and career guidance services as part of the vocational application 103 to each of the client devices 110 connecting to and requesting the services from the vocational application 103. Embodiments of the client device 110 may interact, submit requests, execute commands and receive guidance from the vocational application 103 via the vocational application user interface 112 being displayed by a human-readable display 718 of the client device 110. Embodiments of the vocational application 103 may include a plurality of components, modules, engine and/or programs, which may be part of or linked to the program code of the vocational application 103. Examples of these components, modules, engines and programs include a data gathering module 105, user profile module 107, knowledge base management module 109 (abbreviated "knowledge base mgmt 109" in the drawings), ranking module 111, analysis engine 113, and a reporting engine 115.

Embodiments of the data gathering module 105 may perform functions or tasks of the vocational application 103 directed toward collecting and compiling user information, user data 130, course & curriculum data 122, and occupational data 126 from one or more sources of user data 130. The sources of user data 130 gathered by the data gathering module 105 may be retrieved from a plurality of network accessible data sources 120, 124, 128 as well as sources of information stored by or accessible via the client device 110. The gathering of user data 130 by the data gathering module 105 can be performed for a plurality of functions. The first function of the data gathering module 105 may be to gather information and user data 130 describing a user for the purpose of defining a user profile. Embodiments of the user profile may categorize and/or identify characteristics of the user that may be relevant for providing one or more vocational action to the user, including characterization of the user based on the user's interests, activity, habits, personality, experiences, preferences, geographic location, etc.

Figure 4:
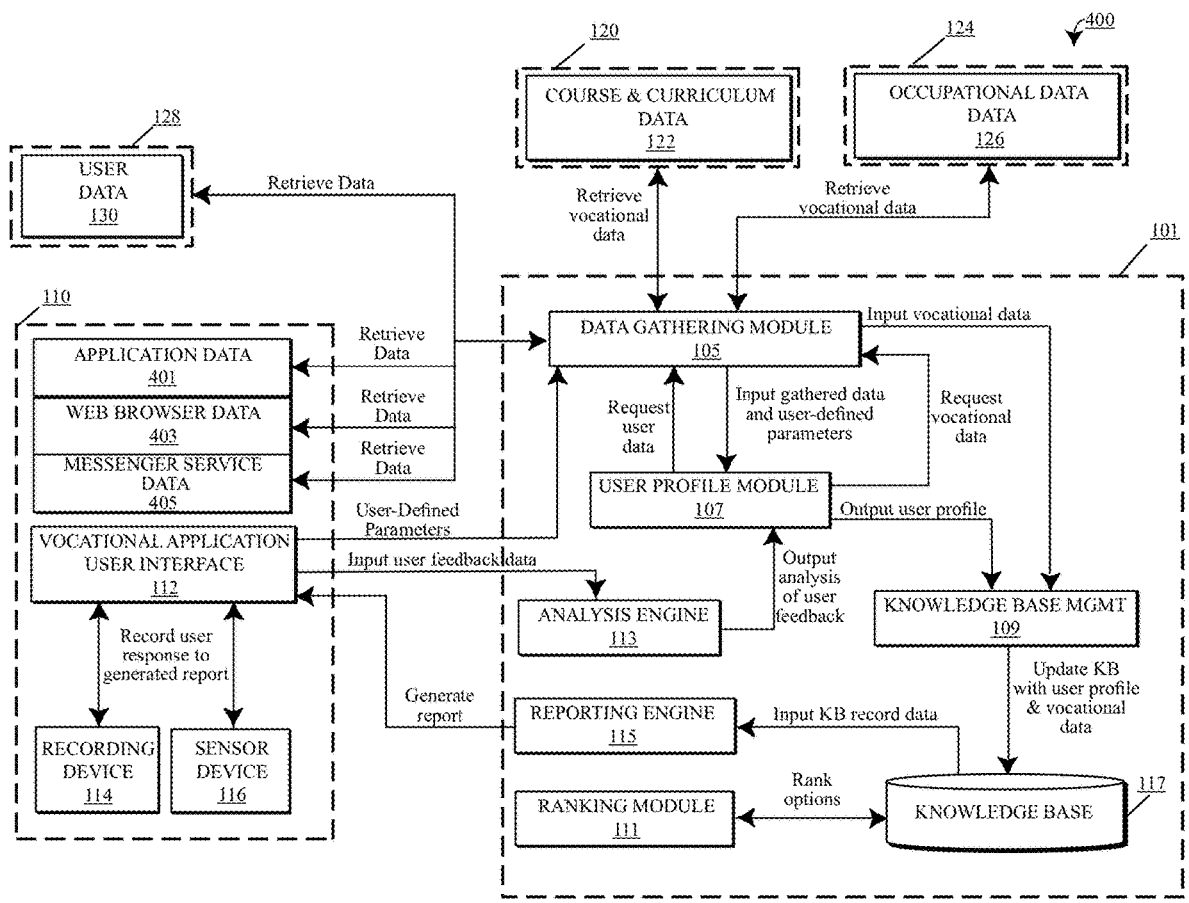
FIG. 4 depicts a flow diagram describing a workflow of an embodiment of a computer environment in accordance with the present disclosure.

Embodiments of the data gathering module 105 may gather user data 130 describing the user from a plurality of data sources 120, 124, 128, including user-accessed data sources 128 which may host, store and update user data 130 each time the user connects or interacts with the user-accessed data source 128. For example, a user-accessed data source 128 can be a website, network accessible application or service. Moreover, the data gathering module 105 may also collect and compile user data 130 describing the user from sources of data locally stored or maintained by the client device 110, including locally running programs, applications and services, as shown by the example in FIG. 4 depicting the user data 130 of the client device 110 to include application data 401, web browser data 403 and messenger service data 405. Sources which can provide user data 130 describing a user's activity, behaviors, interests, habits, location and experiences may include (but is not limited to) data obtained from local or network accessible applications, programs or services, web browser history, web pages, cookies, internet clients, email, messenger services, short message service (SMS), social media networks, calendar services or programs, global positioning system (GPS) hardware or navigation software, application program interfaces (API), audio or video streaming services, or any other data source that may be known to store, maintain and collect user data 130. Moreover, the data gathering module 105 may continuously monitor which user-accessed data sources 128, such as web pages, locally running or network accessible applications, programs and services are being accessed by the user. The data gathering module 105 may retrieve user data 130 from each source continuously or intermittently at scheduled retrieval times.

Collection of user data 130 from one or more sources of data, including a user-accessed data source 128, by the data collection module 105 may be performed using tools know or used by persons skilled in the art of data collection. Examples of tools or data collection solutions that may be implemented by the data collection module 105 include webpage crawling tools, natural language processing of text or videos, data mining, text pattern matching, HTML parsing, document object model parsing, scraping metadata or semantic markups and annotation, etc. Customization of the data collection module 105 may be implemented on the retrieval of the user data 130. For example, a user can input specific sets of preferences or restrictions on the types or sources of user data 130 being collected. In some embodiments, limits may be set or established directed toward the amount and/or type of user data 130 being gathered. For example, the server computer 101 or the user limits the number of text files retrieved or videos retrieved each time the data collection module 105 gathers user data 130. For instance, limiting the number of text files to 400, videos to 10, search history to 100, etc.

The collection of user data 130 may be made transparent to the user as the user interacts with the vocational application 103 via the vocational application user interface 112. Users may actively opt-in to the collection of user data 130 by affirmatively electing to allow the data gathering module 105 to collect user data 130 from user-accessed data sources 128, as well as inform the user which other local or network accessible applications, programs and services running on client device 110 may be providing user data 130 to the data collection module 105. Embodiments of the vocational application 103 may allow for the user to actively control and select which types of user data 130 will be collected by the data gathering module 105, and the data sources 120, 124, 128 that are given permission to share the user data 130, including the user's information with the data gathering module 105. Notifications may be presented to the user via the vocational application user interface 112 each time the data gathering module 105 collects user data 130 from one or more user-accessed data sources 128, the client device 110 or other network accessible computer systems 700. Users may be further able to define how the user data 130 will be used, and which $3^{rd}$ parties (if any) will be able to view the collected user data 130. Moreover, a user may control how long user data 130 may be accessible to the data gathering module 105, set limitations on user data 130 storage and the user may set parameters for when user data 130 will be deleted from the server computer 101 and/or from network accessible storage devices tasked with maintaining the collected user data 130.

In addition to the collection and retrieval of user data 130 from a plurality of sources to define user's interests, behaviors, experiences, habits, etc., the data collection module 105 may further perform the function of retrieving vocational data from one or more data sources 120, 124, 128. The term "vocational data" may refer to data describing a career, occupation or vocation (shown as "occupational data 126") and/or educational information that may be associated with the career, occupation or vocation (shown as course & curriculum data 122"). Vocational data may be used as presentation material which may provide details about careers, jobs and vocations as well as educations requirements and programs for achieving a career within a particular occupation or vocation. As shown in FIG. 1, vocational data may include occupational data 126 collected from one or more occupational data sources 124 and/or course & curriculum data 122 collected from one or more educational institution data sources 120. Occupational data 126 may include information describing a career, occupation or vocation. For example, descriptive literature describing the duties performed by the vocation, education or training requirements, professional qualities or preferred experience, licensing requirements, job openings, enterprises and competitors that hire a particular vocation, different fields, sub-fields or specialties a person may operate within as part of the vocation, salary information, or any other type of information that may be useful for learning about a vocation, career or requirements for being employed.

Embodiments of occupational data sources 124 may be any type or source of data that may be able to store, update, transmit and provide occupational data 126 describing one or more details of a career, job or vocation to the data gathering module 105. Embodiments of an occupational data source 124 may comprise web pages, applications, services, databases, data warehouses or other types of information repositories. Occupational data sources 124 may be owned, operated and maintained by enterprises, trade unions, schools, universities, colleges, state local or federal government, the military, professional associations, licensing bodies, volunteer organizations, non-profit companies or any other entity known or used by a person skilled in the art to obtain information about a career, job or vocation. Examples of the occupational data source 124 include social media networks, job forums, job boards, websites associated with corporations, schools, universities, trade unions, professional associations, government, etc.

Embodiments of course & curriculum data 122 may be described as any type of data that may inform or educate a user about an educational program, educational body, governing institution, educational institution, licensing body, professional association or other credential administering group, including information providing descriptions of courses, training, curriculum, licensing, certification or other requirements that may be necessary in order to practice a particular profession, occupation or vocation. For example, the course & curriculum data 122 can include course descriptions and requirements for completing a degree at a university or certifications offered by an enterprise, including a description of required courses, credit hours, costs of attendance, entry requirements for the program, scholarship information, etc. In other embodiments, the course and curriculum data 122 can describe a licensing examination, pre-requisites for receiving a license, and information about how to sign up and/or costs associated with taking the examination.

Embodiments of the data gathering module 105 may further collect and gather direct input from a user as one or more user-defined parameters. A user may directly input user information and/or preferences into the data gathering module 105 via the vocational application user interface 112. User-defined parameters might include any data provided by a user that may influence the vocational action presented by the vocational application 103. For instance, the user can define a geographic location or region that the user may prefer to limit the presented vocational action being presented. For example, a user inputs a user-defined parameter that imposes a geographic location restriction to limit the search within 200 miles from the user's hometown. Accordingly, as a result of the geographic location restriction, the vocational application 103 may include vocational data directed toward careers, vocations and educational programs within the geographic location restriction imposed by the user. Other user-defined parameters may include the user directly inputting the user's interests, preferred careers or vocations, preferred educational institutions and/or limitations on the types of education that may be required by a certain profession.

A user may select or customize which vocational action presented that may rise to a particular level of education, additional certifications or licensing requirements. For example, a user imposes a limitation of education that would limit the presented vocational action based on the amount of education needed. For instance, by limiting the presented vocational action to those vocations and careers that require a bachelor's degree or lower to be employed and practice. Accordingly, based on the user-defined parameters, the vocational application 103 may avoid presenting to the user any vocational action that might require additional graduate school requirements from being presented, for example, such as those required by the professions of a physician, dentist, psychiatrist, or attorney.

In some embodiments, user-defined parameters may be based on the user's current situation or desired goals to be achieved from being employed in a particular profession. For example, inputting a desired median salary to limit the options to only vocational action that may earn a salary within a desired salary range. In some embodiments, a user may provide additional information that may assist the vocational application 103 with making an assessment of the user's vocational action. For example, a user provides a threshold level of investment expecting to be spent on fulfilling education, training or licensing requirements to the data gathering module 105. Based on the user's threshold investment level specified, the types of vocations and/or educational program options presented to the user could be managed by the vocational application 103 by prioritizing careers with lower barriers of entry and/or by prioritizing lower cost programs and options based on projected costs. For example, by prioritizing public university or community college options over higher cost, out-of-state or private universities.

In some embodiments, users may also voluntarily provide to the data gathering module 105 additional information about the user that may not otherwise be known to the data gathering module 105 unless the information is voluntarily provided by the user. For example, a user voluntarily submitting to the data gathering module 105 a high school or college transcript, GED certificates, standardized testing and/or entrance exam scores. The additionally provided educational information can further assist the vocational application 103 with recommending vocational action to a user. For example, by identifying vocational action that align with the educational strengths of the user based on grades and test scores, as well as presenting appropriate educational institutions that a user would most likely be accepted to attend.

Embodiments of the server computer 101 and/or vocational application 103, may include one or more security features to secure and protect data collected by the data gathering module 105 and/or data provided to the data gathering module 105 by the user. As mentioned above, users have the ability to select and limit not only which types of data are made accessible to third parties, but a user also limit which third parties may have access to the data collected or provided to the data gathering module 105. Moreover, embodiments of the vocational application 103 may further secure the collected data against undesired or unauthorized uses by anonymizing the collected data in order to prevent third parties from obtaining or accessing any personal identifying information about any one particular user and to maintain user privacy.

Embodiments of the vocational application 103 may apply one or more data anonymization techniques to the collected user data 130 obtained or provided to the data gathering module 105. Data anonymization techniques that may be applied to the collected user data 130 may include removal of one or more fields that could be used to identify the user, scrubbing personally identifying information from the user data 130, and/or tokenization of personally identifiable data with a numerical representation. Advanced techniques such as generalization of the collected data to achieve k-anonymity and differential privacy may also be employed. Generalization of data may be performed by removing portions of the collected user data 130 and replacing the data with a common value amongst a range or group of similar persons to achieve k-anonymity. L-diversity may be achieved within the group wherein personal identifiers are first generalized by making sure each attribute being generalized occurs a minimum number of times so that any one person within the group cannot be singled out. The technique of differential privacy may refer to the technique of adding mathematical noise to the data making it difficult to ascertain whether any one individual is part of the data set because the output of the noise algorithm may appear the same whether or not a user's information is included or omitted.

Embodiments of the vocational application 103 may comprise a user profile module 107. The user profile module 107 may be responsible for performing the functions or tasks directed toward managing the creation, modification, and update of user profiles for each user accessing the vocational application 103. Embodiments of the user profile module 107 may define each user profile based on the set of user data 130 gathered by the data gathering module 105 and user-defined parameter values inputted into the vocational application 103 via the vocational application user interface 112. Embodiments of the user profile module 107 may analyze the set of user data 130 extracted from each user-accessed data source 128 and client device 110, characterize each piece of user data 130 as applying to one or more characteristics or features that may be used to define the user profile and/or apply one or more user parameter values, tags or keywords to each piece of user data collected. Embodiments of the user profile module 107 may include a profile database or type of repository where the gathered user data 130 can be stored, including data describing the user's activity in both a real or virtual space, along with the user parameter values corresponding to the collected set of user data 130. For example, the data gathering module 105 collects user data 130 describing the user's activity and genres of content viewed or interacted with on one or more websites, such as a social media website or media streaming service. As the user profile module 107 analyzes the user data 130 extracted from websites, the user profile module 107 identifies characteristics and fields of information that may be provided to user accessed data source 128 by a user, including user data 130 describing such information as the user's name, geolocation, age, birthdate, interests, hobbies, comments, ratings, feedback, browsing history, search queries, habits, reviews, liked or disliked content, messenger service data, social media connections such as family members and friends and any other information available or posted via the website by the user.

Embodiments of the user profile module 107 may parse the text of the user data 130 or use natural language processing techniques to convert the user data 130 into text, and further understand the content of the text by breaking down the text into smaller units, words, and phrases. The user profile module 107 may apply part of speech tagging to understand each word, identifying a word's part of speech and the word's tense. Embodiments of the user profile module 107 may include a lexicon and a set of grammar rules encoded into the user profile module 107 and/or may apply statistical machine learning to the grammar rules to determine the meaning behind the collected user data 130. Once the user profile module 105 has analyzed and understood the user data 130, portions of the user data 130 can be characterized using keywords or tags applied to the user data 130 and the user-defined parameters to understand the preferences, habits, activities, geolocation and interests of the user and may generate a plurality of user parameter values corresponding to the plurality of parameters of the set of user data set and user-defined parameters.

Embodiments of the user profile module 107 may structure the data being stored within a database in a parameter-value tuple. The analyzed user data 130 may be used to create, modify and update the user profile by filling in one or more fields of the user profile. For example, a natural language processor analyzing user data 130 comprising a school transcript could identify features such as the user's name, courses taken, the grades associated with each course taken, and overall grade point average (GPA). The transcript information can be applied to one or more fields of the user profile and inferences can be made based on the grades in a particular course of study the interests of the user in particular topics and which topics the user naturally excels. For example, a user receiving A's in the topics of physics, biology and chemistry, along with additional user data such as messaging data or emails discussing scientific topics and/or a browser history demonstrating several scientific websites being visited by the user, each of these factors can weigh the user profile towards defining the user as being interested in one or more scientific fields. Accordingly, vocational action presented by the vocational application 103 may also reflect the user's interest in the scientific fields.

Embodiments of the user profile module 107 may define a user profile in a plurality of different ways. Embodiments of the user profile module 107 may create a brand-new user profile for each user, select a user profile for each user from an existing profile template that most closely fits the interests, personality and behavior of the user from a pool of user profile templates and/or a hybrid user profile that customizes an existing user profile template using the gathered user data 130 and user-defined parameters. In an embodiment wherein the user profile is brand new and fully defined by the user profile module 107, the user profile module 107 may create the customized user profile based entirely on the gathered user data 130 and user-defined parameters to compile as complete a picture about each individual user as possible and based on the compiled user data 130 and user-defined parameters identify the user's interests, personality, hobbies, skills, experiences, strengths, etc. within the user profile. The traits of the user as described by the user data 130 and user-defined parameters, can be further matched to historical user profiles maintained by the user profile module 107 and/or the knowledge base 117 to further determine which vocational actions, including which careers, occupations, vocations and/or educational opportunities are most closely aligned with the user profile have been considered interesting by historical users of the historical user profiles. Wherein, the more closely a user profile resembles one or more historical user profiles, the higher the probability that the vocational application 103 would recommend one or more of the vocational action previously recommended to a historical user profile to the current user seeking guidance from the vocational application 103.

In some embodiments, the user profile module 107 may match each user to user profiles associated with particular careers, occupations, vocations and/or educational opportunities using an ontology of careers, vocations and educational opportunities created by vocational application 103. Embodiments of the ontology may be maintained as part of the knowledge base 117. An ontology may refer to a representation of knowledge by a set of concepts within a domain and the relationships between those concepts in order to model the domain of knowledge being represented. The ontology created by the vocational application 103 may comprise the relationships and properties of all the existing and known vocational actions available to a user, including but not limited to careers, vocations, educational courses, educational institutions, licensing requirements, internships/volunteering etc. The ontology may be represented by a graph, and each node of the graph may contain a list of properties, skills, interests, etc. (i.e. as parameter values or parameter value ranges associated with a vocational action), that a user may have to be considered interested or associated with the vocational action (such as a career, vocation or educational opportunity) that may be associated with the node of the graph. For example, nodes of the ontology could be associated with any field, course of study, interest, hobby, educational level, etc., such as math, logic, digital circuits, animal study, biology, chemistry, robotics, or any other field.

Embodiments of the graphical representation of the ontology may be created manually in some embodiments. In other embodiments, the ontology may be created from the data collected by the knowledge base 117 (described below) using automated techniques such as text mining, machine learning, data clustering, etc. to create the nodes of the ontology's graphical representation. In yet another embodiment of the ontology, the graphical representation of the ontology may be created using a combination of both manual creation and automated techniques. The graph of the ontology may be further enhanced and continuously updated in some embodiments as the user data collected by the knowledge base 117 and user feedback is collected. Enhancements of the ontology can be made by considering the availability of the data used to create the graph, the quality of the data collected, the location of the user and/or available locations where a user can pursue to study a particular topic or interest, and the weight of a node. Embodiments of the nodes may be weighted more heavily than other in some embodiments to accommodate for the quality of data used to construct the node and/or user feedback from historically presented career and educational options to historical users of the vocational application 103. For example, in some embodiments, nodes can be rated using a data quality index with a quality score assigned to each node (i.e. 0-100; 0-1, etc.), wherein nodes having a higher quality score are more heavily weighted in the ontology when selecting career, vocation and educational options to associate with a user's profile.

Alternatively, in some embodiments, a user profile may be selected from a one or more pre-defined profile templates, which may be modeled using the ontology, historical data collected by user profile module 107 and/or pre-defined classes of hypothetical users modeled by the vocational application 103. Embodiments of the user profile module 107 may assign a user profile template to a user by comparing the identified user interests, skills, habits, personality, experiences, and user-defined parameters, with the pre-defined profile templates to determine which user profile template most closely aligns with the user's data 130 and user-defined parameters. For example, each pre-defined profile template may include a plurality of user parameter values respectively corresponding to (at least in part) to the collected user data set. As the user's data 130 and user-defined parameters periodically change throughout the user's use of the vocational application 103, the user profile module 107 may adjust or change the user profile template to another template that may include a plurality of user parameter values more closely matches the user based on the most up-to-date set of user data 130 and user-defined parameters.

For example, based on the user data 130 collected by the data gathering module 105, a user is initially assigned, based on the ontology, a user profile template associated with individuals who excel in mathematics and who have expressed interests in building and design, typically associated with engineering professionals. In this example, upon receiving updated user data 130, the updated user data 130 exemplifies that the user has expressed a heavy interest in the graphical arts, art theory and computer animation. As a result, according to the ontology, the profile template associated with engineering professions may be changed by the user profile module 107 due to the updated user data aligning more closely with individuals having an interest in graphical design, computer animation and digital media. Accordingly, in this example, the user is subsequently defined by a different user profile template (i.e. a profile aligning traits in common with digital media and graphical design professions instead of engineering). Although, in some embodiments, while the changes in the user data 130 over time may result in changes to the ontology and thus the pre-defined template assigned to the user, the differences between the pre-defined templates may gradually shift, modeling users who may be identified as having passions for careers spanning across multiple career fields. Accordingly, different vocational action may be ranked (as discussed below) before presenting information to the user, allowing for many vocational action to be presented in an order based on how closely each vocational option is indicated by the user data 130 and/or user-defined parameters to match the interests and personality of the user.

In some embodiments of the user profile module 107, a user profile may be applied to a user using a hybrid of the customized method and the pre-defined template method described above. Referred herein as a hybrid method for defining a user profile. Embodiments of the hybrid method may start out by identifying and selecting a user profile template that most closely aligns with the user's interests, skills, personality, habits, experiences, etc. based on the user data 130 collected by the data gathering module 105 and the user-defined parameters. While the pre-defined user profile template selected by the user profile module 107 may closely match the preferences and experiences of the user for the purposes of identifying a starting point for vocational action that may be of interest to the user, outliers in the user data 130 or user-defined parameters may exist. These outliers may offer important information that could be used to identify additional careers, vocations or educational opportunities that may be applicable for recommendation to the particular user, but such recommendations may not normally be made with the pre-defined template that most closely matches the user data 130. Accordingly, the user profile template and/or vocational action recommended based on the selected user profile may be modified or customized to the user's preferences, experiences and interests described by the user data 130 and user-defined parameters to account for the variation of interests or experiences by the user that may make the particular user vary from user's traditionally being defined by the selected user profile template.

Embodiments of the vocational application 103 may further comprise a knowledge base management module 109. The knowledge base management module 109 may perform functions or tasks directed toward managing read and writing operations of knowledge base 117 and the plurality of records maintained by the knowledge base 117. Embodiments of the knowledge base management module 109 may create new records in the knowledge base 117. For example, creating new records for each user accessing the vocational application 103, based on the receipt of the user profile defined by the user profile module 107 and the vocational data received from the data gathering module 105. As the vocational application 103 continuously receives user data 130, new or updated user-defined parameters and user feedback from the analysis engine 113, updates to existing knowledge base 117 records may be made by the knowledge base management module 109. For example, a user profile module 107 updating or redefining a user profile requests to update the knowledge base 117 based on the modifications to the user profile by transmitting the update request to the knowledge base management module 109. Moreover, embodiments of the knowledge base management module 109 may not only update existing records of the knowledge base 117 based on the receipt of updated user profile information, but also in response to updated vocational data retrieved by the data gathering module 105 and user feedback in response to one or more generated reports received from the analysis engine 113 (described below) identifying a user's interest in one or more presented vocational action using a recording device 114 or sensor device 116.

Embodiments of the knowledge base 117 may be a software application separate from the vocational application 103, integrated into the vocational application 103 or a standalone set of tools which may be stored directly on the persistent storage 706 of the server computer 101. In alternative embodiments, the knowledge base 117 may be accessible remotely by the server computer 101 over network 150. For example, by installing the knowledge base 117 on a network accessible repository or remotely accessible computer system 700. The term "knowledge base 117" may refer to a human readable or machine-readable resource for disseminating and optimizing information collection, organization and retrieval. The knowledge base 117 may draw upon the knowledge of humans and artificial intelligence that has been inputted into the knowledge base 117 in a machine-readable form and may be structured as a database. Embodiments of the knowledge base 117 may be used to find solutions to current and future problems by using the data inputted into the knowledge base 117 from past experiences to make informed decisions and/or recommendations to a user or administrator of the server computer 101 and/or vocational application 103 hosted by server computer 101.

Embodiments of the knowledge base 117 may not be simply a static collection of information. Rather, the knowledge base 117 may be a dynamic resource having the cognitive capacity for self-learning, using one or more data modeling techniques and/or by working in conjunction with one or more machine learning programs and predictive modeling algorithms to improve the accuracy of predicting and presenting vocational actions to the user based on user profiles, vocational data being stored by the knowledge base 117 and the ontology modeled using the collected data. Embodiments of the knowledge base 117 may apply problem solving logic and use one or more problem solving methods to provide a justification for conclusions reached by the knowledge base 117 when recommending the vocational actions being compiled into a report for a user.

The exemplary embodiment of the knowledge base 117 may be a machine-readable knowledge base 117 that may receive, and store information inputted into the knowledge base 117 as one or more database records. The content of each record may include the identity of the user, current or historical user profiles defined by the user profile module 107, vocational data and user data 130 collected by the data gathering module 105, a plurality of parameter value ranges that may be associated with a vocational action, vocational actions being recommended to each user of the vocational application 103, as well as rankings of the vocational actions provided by the ranking module 111 for each user. User profiles defined by the user profile module 107, career, vocational and education options recommended to the user, and rankings thereof provided by the ranking module 111 may be maintained by the knowledge base 117 for future reference, comparison and predictions. Each time the vocational application 103 is used by one or more user, additional data sets may be stored to the knowledge base 117, allowing for the vocational application 103 and server computer 101 to "learn" from the additional data being stored to the knowledge base 117 in order to provide improve vocational action recommendations and guidance to subsequent users based on each user's own unique user-defined parameters.

Embodiments of a knowledge base 117 may comprise a plurality of components to operate and make decisions that may be useful to users of the vocational application 103 for requesting and receiving career and/or educational guidance. Embodiments of the knowledge base 117 may include components such as a fact database, rules engine, a reasoning engine, a justification mechanism and a knowledge acquisition mechanism. The facts database may describe a current fact pattern surrounding a particular user seeking career and educational guidance from the vocational application 103. For example, the knowledge base 117 receives the output from the user profile module 107 describing the user profile of the current user, as well as the set of user data 130, a plurality of parameter values corresponding to the set of user data 130, and vocational data gathered by the data gathering module 105.

Embodiments of the rules engine of a knowledge base 117 may be a set of universally applicable rules that may be created based on the experience and knowledge of the practices of experts, developers, programmers and/or contributors to the knowledge base 117. The rules created by the rules engine may be generally articulated in the form of if-then statements or in a format that may be converted to an if-then statement. The rules of the knowledge base 117 may be fixed in such a manner that the rules may be relevant to all or nearly all situations covered by the knowledge base 117. While not all rules may be applicable to every situation or user being analyzed by the knowledge base 117, where a rule is applicable, the rule may be universally applicable.

Embodiments of the reasoning engine of the knowledge base 117 may provide a machine-based line of reasoning for solving problems, such as deciding which careers, vocations, educational programs, and other vocational actions to report to the vocational application user interface 112. The reasoning engine may process the facts in the fact database and the rules of the knowledge base 117. In some embodiments of the knowledge base 117, the reasoning engine may also include an inference engine which may take existing information in the knowledge base 117 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge base 117 may explain and/or justify how a conclusion by the knowledge base 117 was reached. The justification mechanism may describe the facts and rules that were used to reach the conclusion. For example, justify why vocational action were selected and presented to the user. Embodiments of the justification mechanism may be the result of processing facts describing a current user in accordance with the entries of the knowledge base 117, the reasoning engine, the rules and the inferences drawn by the knowledge base 117. The knowledge acquisition mechanism of the knowledge base 117 may be performed by a manual creation of the rules, a machine-based process for generating rules or a combination thereof.

Embodiments of the knowledge base 117 may determine which vocational action to present to each through the use of one or more machine learning techniques. The machine learning techniques may be used to analyze user profiles, user-data 130, vocational data and user-defined parameters to arrive at the vocational action that will be presented to the user and may include supervised learning, unsupervised learning and/or semi-supervised learning techniques. Supervised learning is a type of machine learning that may use one or more computer algorithms to train the knowledge base 117 using labeled examples during a training phase. The term "labeled example" may refer to the fact that during the training phase, there are desired inputs that will produce a known desired output by the knowledge base 117. The algorithm(s) of the knowledge base 117 may be trained by receiving a set of inputs along with the corresponding correct outputs. To employ supervised learning, the knowledge base 117 may store a labeled dataset for learning, a dataset for testing and a final dataset from which the knowledge base 117 may use for presenting vocational action to each user via the vocational application user interface 112.

Embodiments of the supervised machine learning algorithms may learn by comparing the actual output with the correct outputs in order to find errors. The knowledge base 117 may modify the model of data according to the correct outputs to refine the decision making of the knowledge base 117, improving the accuracy of the automated decision making of the knowledge base 117 to provide the correct inputs to the reporting engine 115. During the training phase, the knowledge base 117 may learn the correct outputs by analyzing and describing well known historical data and information that may be stored by the knowledge base 117. Examples of data modeling include classification, regression, prediction and gradient boosting. Under a supervised learning technique, the knowledge base 117 may be trained using historical data describing previous users having a defined profile based on user data 130 and user-defined parameters, vocational data describing one or more career, vocation or education options and feedback from the historical users describing the success of the knowledge base to predict which proposed career, vocation and education options presented resonated with the interests of the user.

Unsupervised learning techniques on the other hand may be used when there may be a lack of historical data describing past users, recommendations and feedback received from the past users of the vocational application 103. Machine learning that is unsupervised may not be "told" the right answer the way supervised learning algorithms do. Instead, during unsupervised learning, the algorithm may explore the data to find common interests, experiences, personalities, habits, activities, defined user profiles and user-defined parameters. Embodiments of an unsupervised learning algorithm can identify common attributes and patterns between users and user feedback of the suggested careers, vocations or educational options presented to the user. Examples of unsupervised machine learning may include self-organizing maps, nearest-neighbor mapping, k-means clustering, and singular value decomposition.

Embodiments of the knowledge base 117 may incorporate semi-supervised learning techniques. Semi-supervised learning may be used for the same applications as supervised learning. However, instead of using entirely labeled training examples during the training phase, there may be a mix of labeled and unlabeled examples during the training phase. For example, there is a small or limited amount of labeled data being used as examples (i.e., limited amounts of historical data) alongside a larger amount of unlabeled data that is presented to the knowledge base 117 during the training phase. Suitable types of machine learning techniques that may use semi-supervised learning may include classification, regression and prediction models.

Embodiments of the computing environment 100, 200, 400 may comprise a ranking module 111. Embodiments of the ranking module 111 may be integrated with the knowledge base 117 in some embodiments, while in alternative embodiments, the ranking module 111 may be a separate component from the knowledge base 117, for example as a network accessible service or program. As shown in the exemplary embodiment of FIG. 1 and FIG. 4, the ranking module 111 may be part of the vocational application 103 and communicate with the knowledge base 117 and/or the knowledge base management module 109. Embodiments of the ranking module 111 may perform the function or task of prioritizing and ranking each of the vocational actions available in the records of the knowledge base 117 for each particular user accessing the vocational application 103. The ranking module 111 may rank the vocational actions from the options most probable to be considered interesting or suited for the user to the least likely the least likely option, based on the user profile, user-defined parameters, user parameter values associated with the set of user data, the vocational data and user data 130. Embodiments of the ranking module 111 may be performed using machine learning models that may be supervised, unsupervised or semi-supervised as described below. In the exemplary embodiment, a support-vector machine (SVM) model algorithm may be used. SVM models may use classification and/or regression analysis to create correlations between careers, vocations and educational opportunities and weights for the different types/values of gathered and stored by the knowledge base 117. For example, in some embodiments, the correlation between the available vocational actions and the user may be based on identifying which vocational actions of the knowledge base 117 has a parameter value range that matches the user parameter values of the user's profile identified via the collected user data 130.

Embodiments of the ranking module 111 may analyze the user data 130, vocational data, user-defined parameters and the user's profile information stored by the knowledge base 117 each time a user runs the vocational application 103. Based on the analysis of the vocational actions gathered from the data gathering module 105, user-defined parameters and in light of the defined user profile, the user parameter values of the user profile, and/or the parameter value ranges of each vocational action, the ranking module 111 may grade each option being considered for presentation to the user using a grading mechanism such as a point system, probability score, compatibility score or other sorting mechanism which may prioritize each career, vocation or educational option based on the compatibility of the available options with the defined user profile, user-defined parameters and/or an interest, hobby, experience, activity, user personality, etc., of the user. For example, a user having good grades in math, an interest in product design, product fabrication, building design and the user specifies an interest in civil engineering as career (i.e. as a user defined parameter). Accordingly, the ranking module 111 analyzes each vocation action and returns a list of ranked career options (or other types of vocational actions in addition to employment types such as internship/volunteer types, education types, licensing types, social types, travel types), including not only civil engineer, but other related fields ranked according to the interests of the user, the user's aptitude (i.e. good grades in particular subjects), user personality, and the specified user-defined parameters. While the user preferred career or vocation options may receive a boost during the ranking process, other careers or vocations may still be ranked higher if the compatibility with the user profile and user data 130 is still considered higher than the preferred career option inputted by the user.

In some embodiments, the ranking module 111 may separately rank educational type options based on the employment types of career or vocation options identified. Each set of educational options may be ranked in view of a specific career or vocation, wherein the educational programs presented to accompany the career or vocation options may be ranked based on user-defined parameters and the user-profile. For example, using the civil engineering example above, and user-defined parameters such as cost, geolocation, length of program as well as the overall prestige of the educational institution and prestige of the specific program are considered by the ranking module 111. The ranking module 111 may assess compatibility with the user based on which educational programs are the highest rated for the career option being analyzed, but also in view of educational programs that meet the users defined parameters. While some of the best schools for a particular career or vocation in the country may be considered for presentation to the user, other factors may outweigh presentation of a particular school or program to the user. For example, geolocation of the university, the probability of the user to be accepted into the school or program and expense of a program. For example, a user living in New York State desiring to remain within NY State may set a user-defined parameter to prefer engineering schools within NY State. Accordingly, even though highly ranked and prestigious schools such as Stanford University, California Institution of Technology, University of Michigan and Purdue University are highly rated institutions for the vocational action being recommended to the user, these universities may be ranked lower or not even considered at all because they are not within the user-defined parameter.

In one exemplary embodiment of the ranking module 111, ranking module 111 may obtain customized sets of preferences or restrictions selected by the user as defined parameters. Based on the set of defined parameters associated with the user's customization, keywords may be created that represent the defined parameters of the user. Using the keywords, the ranking module 111 may be able to pre-select one or more nodes of the ontology representing the career, vocational and educational options known by the knowledge base 117. The data collected by the data gathering module 105 may be mapped to each appropriate node of the ontology and the quality of the user data 130 and course & curriculum data 122 may be measured using a quality index. Measuring the quality of the collected data can be performed by taking into account multiple facts. In some embodiments, quality of the data may be determined using a sentiment analysis of one or more comments associated with the data collected by the data gathering module 105 may be performed. For example, reviews and comments of videos, blogs, or other websites are analyzed for sentiment. In some embodiments the quality may be assessed by reactions from "crowd indicators", for example internet users or users of a particular website where user data 130 may have been collected from. Crowd indicators can include ratings, scores, likes/dislikes, etc.

In the exemplary embodiment, the collected data and being used by the ranking module 111 may be normalized to account for the different ways in which each piece of collected data may be classified, using a quality index. For example, normalizing the quality of collected data can be done by manual representation of a score. For instance, a score of 0-1 may indicate dislike or negative sentiment, a score of 2-3 may be considered neutral; and 4-5 may be considered similar to a "like" or a positive sentiment. Embodiments of the data quality index can be further refined to account for the timing of when the data gathered by the data collection module 105 and how recent comments, scores, or ratings associated with the quality of the collected data was created. The timing may be considered important for the ranking module 111 to expose users to new types of careers or vocations, which may be ranked using newly discovered interests found by the collected data. The ranking module 111 may more heavily weight the newly collected data in some embodiments. As described above, using the data collected by the data gathering module 105 and the user profile, the ranking module 111 may create a ranked list of vocational action based on the defined user parameters, and taking into account the data quality. In some embodiments, the ranking module 111 may inject one or more nodes of the ontology may inject nodes having a low data quality into the recommendation list because some recommendations that may be suitable to the user may not otherwise have enough data or enough high quality data to be ranked at the top of the list of recommended careers, vocations or educational opportunities.

Embodiments of the ranking module 111 may store the rankings of the vocational action in the knowledge base 117, either directly or via the knowledge base management module 109. The ranking module 111 may learn using one or more machine learning techniques described above to adjust the rankings based on changes to the records of the knowledge base 117. As the knowledge base 117 is updated for the current user and/or historical user data sets, the rankings module 111 may adjust the ranking algorithm of the ranking module 111 accordingly to account for the changes to the knowledge base 117 and changes to the predicted compatibility between a user or defined user profile and the vocational action being associated with said user. For example, a ranking module 111 algorithm may change based on feedback received from users after being presented with vocational action. Whereas, a ranking module 111 may have considered certain personalities, experiences and interests to previously be indicative of a high probability of interest by a user in a particular career, feedback from users receiving the vocational action may indicate otherwise. For example, only a small percentage of users showing interest in one or more vocational action presented. Feedback provided to the vocational application 103 may be stored in the knowledge base 117 and during subsequent analysis and rankings of career, vocation or educational options by the ranking module 111, the ranking module 111 will account for the feedback, placing less emphasis on the vocational action that may have previously scored higher when determining compatibility with a user or user profile. The reverse may also be true, wherein a certain career, vocation or educational option is being identified as having a higher probability of compatibility for certain types of users or user profiles based on feedback. Accordingly, the ranking module 111 may also revise the ranking algorithm to more highly weight available options based on feedback from users.

Embodiments of the vocational application 103 may further comprise a reporting engine 115. The reporting engine 115 may perform the task or function of generating one or more reports from the records stored by the knowledge base 117 and presenting the knowledge base 117 information in an organized, human-readable format to the user via the vocational application user interface 112. Embodiments of the reports generated by the reporting engine 115 may include detailed information describing the vocational action ranked by the ranking module 111 and vocational data gathered by the data gathering module 105 that may be associated with each career, vocation or educational option being presented to the user.

Figure 5A:
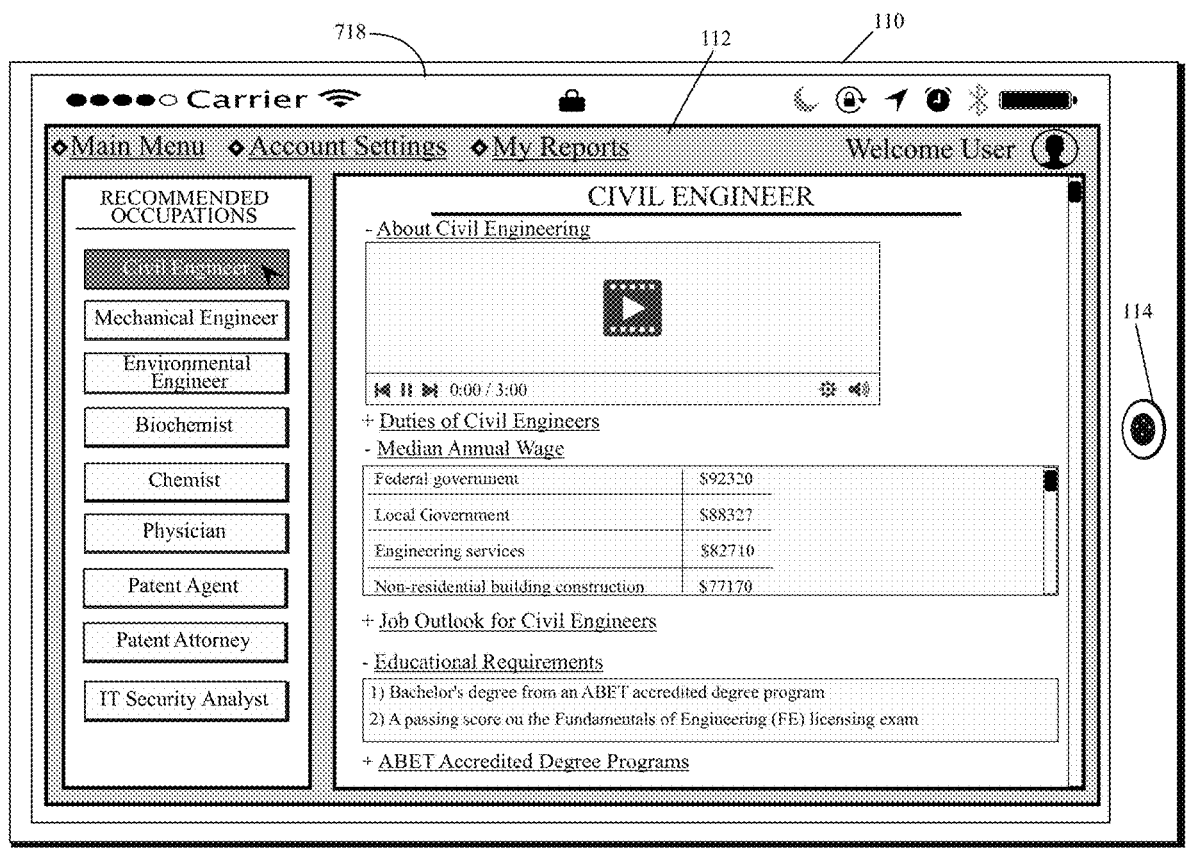
FIG. 5a illustrates an embodiment of a user interface being manipulated by a user, displaying output of a vocational application on a human-readable display.
Figure 5B:
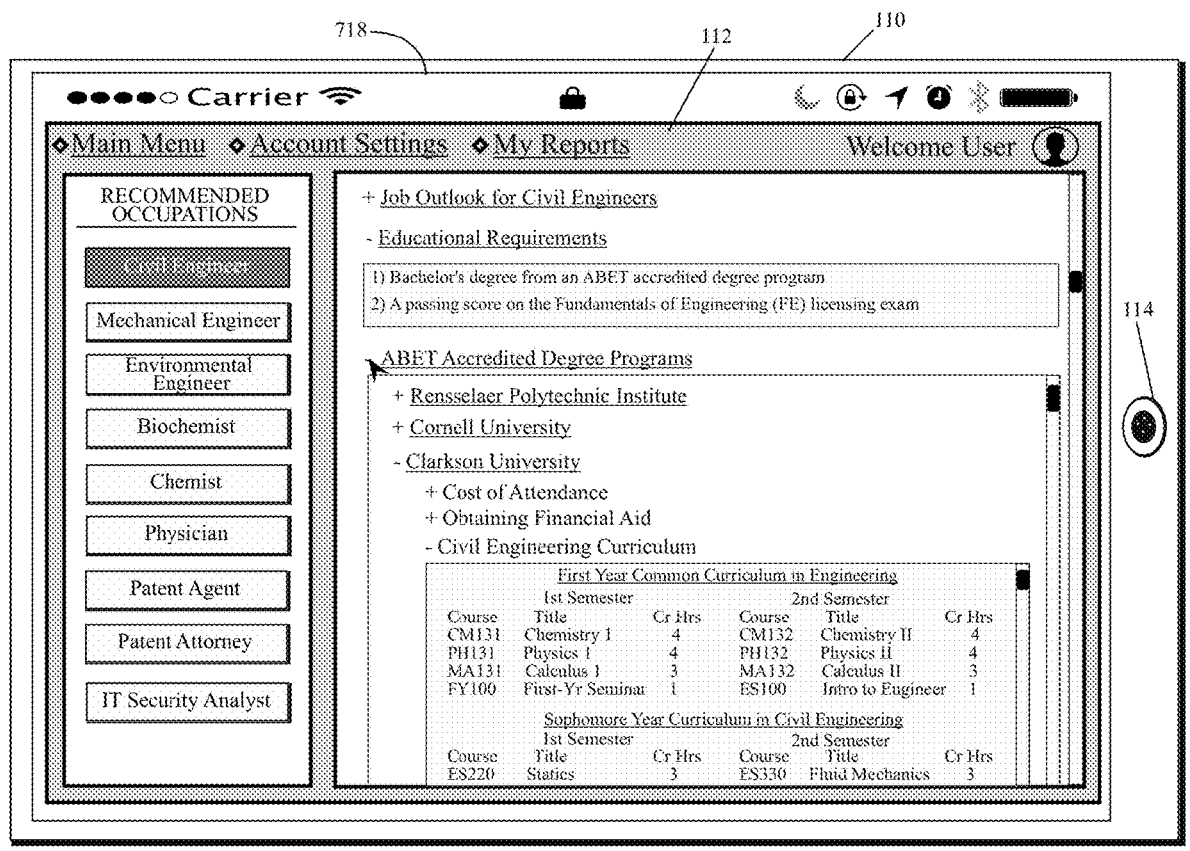

Referring to the drawings, FIGS. 5a-5b depicts an example of an interactive user interface that displays an interactive version of a report generated by the reporting engine 115 being displayed by the vocational application user interface 112 on a human-readable display 718 of a client device 110. It should be understood that the depictions of the report illustrated in FIG. 5a-5b are merely an example and should not be seen as limiting in any way. A person skilled in the art should understand that any sort of additional information could be collected from one or more data sources 120, 124, 128 and provided to the user as part of the generated report. As depicted in the example shown by the drawings, the interactive report prepared by the reporting engine 115 may be organized by career or vocation options being presented to the user. As shown in the FIGS. 5a-5b, the options being presented to the user are ranked and displayed along the side of the vocation application user interface 112. A user receiving the interactive report may actively select to view the associated information and vocational data tied to each career or vocation option being presented, including occupational data 126 and course & curriculum data 122 previously gathered by the data gathering module 105 from one or more data sources 120, 124, 128. A user may manipulate the portions of the report being displayed as well as provide feedback about the sections of the report being displayed. As shown by the examples in the drawings, a user may click or touch (in the case of a touchscreen) each presented vocational option to reveal more detailed information about the selected vocational option.

In some embodiments the reporting engine 115 may prepare a report comprising text, images, audio, video and interactive media sections that the user may navigate through to learn more details about the selected career or vocational action. As shown in the example of the report depicted in FIGS. 5a-5b, a user can navigate to different topics, sections and subsections about each selected vocational option by selecting the desired area of the report and expanding the section to reveal additional information. For example, in FIG. 5a, a user can expand the "About Civil Engineering" section of the report to reveal a video player that comprises a movie clip describing to the user additional information that can be viewed via pressing the play button on the movie player embedded into the report. In another example of the report depicted in FIG. 5a, a section heading entitled "Median Annual Wage" is shown to be expanded to reveal a table comprising text describing the median annual wages for the selected career option being presented for different sectors of the career that a user may operate in while engaged in the selected profession. Likewise, similar to the median annual wage section of the report, in another example of a section within the report entitled "Educational Requirements" the section can be selected and expanded to reveal education, licensing or other certifications that may be required to practice the selected vocational option of the report.

In some embodiments of the report generated and presented by the reporting engine 115, sections of the report may be devoted to presenting one or more sets of educational information, including the course & curriculum data 122. As shown by the example depicted in FIG. 5b, the provided report can compile course & curriculum data 122 from each educational institution that may be relevant to the selected career or vocation option being viewed by the user. For example, in the drawings of FIG. 5b, a user has selected a career option for "Civil Engineer" and as part of the user's selection of the civil engineer profession, the report includes an expandable section and subsections providing a plurality of options for earning a degree from a civil engineering program. As shown in the example, several sections and subsections describing different educational options can be selected and expanded to reveal additional information about the various educational institutions, the cost of attendance, financial aid and scholarship availability, and even a detailed listing of the curriculum for the selected career which includes a semester by semester breakdown of each course that is required for completing the educational program. In some embodiments, multiple educational institutions may be described by the report, allowing for users to expand and review details about each educational institution or program being recommended in a side by side or direct comparison.

Users receiving and reviewing the report generated by the reporting engine 115 may provide user input as feedback to the vocational application 103 which can to improve the recommendations and vocational action presented in subsequent reports. Feedback and comments from the user may be inputted via vocational application user interface 112. Embodiments of feedback may be directly submitted by the user in response to viewing the report in some instances. For example, rating one or more sections of the report, clicking a "like" button or other indicator of approval for the sections of the report being observed by the user. In some embodiments, feedback from the user may be collected from user providing a score for each report (for instance between 1 to 5, wherein the higher the value, the higher the user's satisfaction may be with the report).

In some embodiments, the vocational application 103 may receive permission from the user to track and record data that describes the user's physical or physiological reaction to observing and reading sections of the report provided by the reporting engine 115. For example, feedback and feedback data can be collected, recorded and measured by using recording devices 114 and/or sensor devices 116 to record the user, including the user's gestures, facial expressions, eye movements, pupil dilation, heart rate, pulse, voice patterns, vocal comments, and other physical or physiological signs that would express a user's interest, excitement, or satisfaction with the contents of the report. In embodiments a user's level of satisfaction based on face recognition, a model may be used to detect faces and relate them to scores which can be trained using machine learning techniques along with recording devices 114 and/or sensor devices 116.

Embodiments of the recording devices 114 and sensor devices 116 may be integrated into one or more computer systems 700 of network 150, such as the recording device 114 integrated into the client device 110 as shown in FIGS. 5a-5b. In alternative embodiments, the recording device 114 and sensor device 116 may be integrated into separate computer systems 700 such as an IOT device, wearable computing devices such as a smartwatch or smart glasses, or publicly placed devices. A recording device 114 may be described as a device or instrument capable of recording and reproducing signals. For examples a camera, digital video recorder, microphone, sound recorder, or tape recorder, or any other device or instrument known in the art. A sensor device 116 may include devices or instruments that can detect or measure a physical property or stimulus and records, indicates or responds thereto. Examples of sensors may include temperature sensors, proximity sensors, accelerometers, infrared sensors, pressure sensors, optical sensors, acoustic sensors, ultrasonic sensors, UV sensors, touch sensors, or any other type of sensor known or used in the art.

Embodiments of the vocational application 103 may comprise an analysis engine 113. The analysis engine 113 may perform the task or function of collecting and analyzing the feedback data received from the vocational application user interface 112, recording device 114 and/or sensor device 116, as shown in the flow diagram of FIG. 4. Embodiments of the user's feedback while observing one or more sections of the report generated by the reporting engine 115 may be observed by one or more recording devices 114 or sensor devices 116. The recorded feedback data may be transmitted back to the server computer 101 wherein the feedback data may be inputted into the analysis engine 113. Embodiments of the analysis engine 113 may apply one or more machine learning algorithms, analytics, artificial intelligence or deep learning techniques to draw conclusions and make inferences about the user's feedback in order to determine the level of interest by the user for each section of the report. Based on the identified interest of the user for each vocational option presented in the report, the analysis engine 113 may output the analysis of the user's feedback to the user profile module 107. As a result of receiving the output from the analysis engine 113, the user profile module 107 can update the defined user profile based on what the analysis engine 113 has concluded about the user's interests, instruct the data gathering module 105 to collect more vocational data targeted toward the feedback from the user and the sections of the previous report the user has expressed interest in and update the knowledge base 117 to reflect the feedback from the user.

The feedback data collected, and the conclusions drawn from the feedback data by the analysis engine 113 may improve the ability of the vocational application 103 and the knowledge base 117 to accurately predict career, vocation and educational options that each user may have an interest in pursuing. Each time a report is generated and feedback is received, the feedback returned to the vocational application 103 allows for the predictive model to be improved, by providing up-to-date information that informs the vocational application 103 how users defined by a particular user profile respond to one or more different vocational action. Based on the feedback data, one or more models, including the ontology can be updated based on the feedback from the user. More weight may be given to nodes of the ontology that are related to the careers, vocations and educational options that received positive feedback data from the user (both implicitly and explicitly) and/or increase the weight a node may receive when being ranked by the ranking module 111. Moreover, feedback data and the conclusions drawn therefrom improve the ranking algorithm of the ranking module 111 and build upon the existing historical record data collected by the knowledge base 117 to improve predictions for other users having the same or similar interests and user data 130 as past users.

Method for Dynamic Career and Education Counseling

Figure 6A:
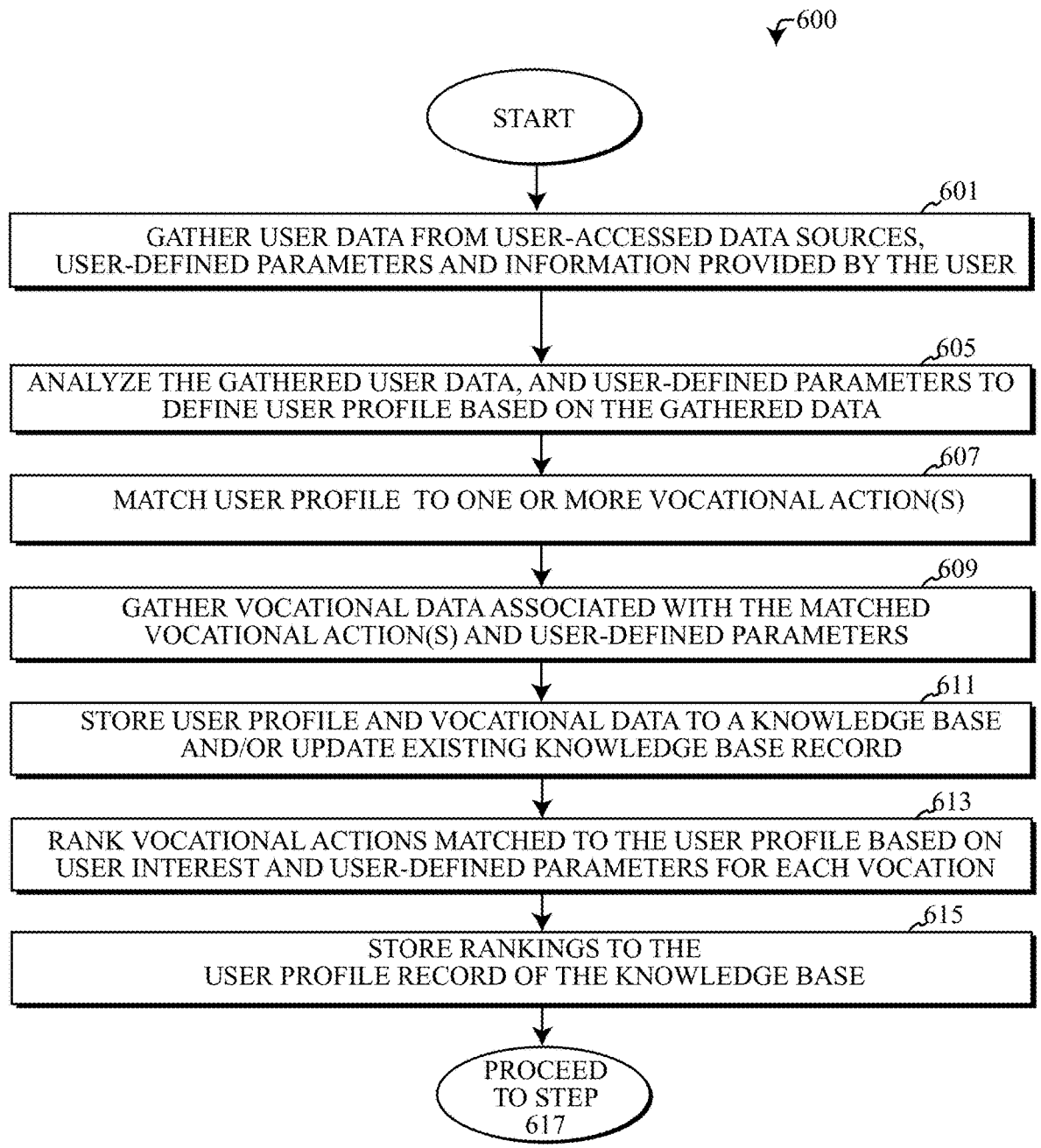
FIG. 6a depicts a flow diagram of an embodiment of a computerized method for dynamically customizing career and educational counseling consistent with the present disclosure.
Figure 6B:
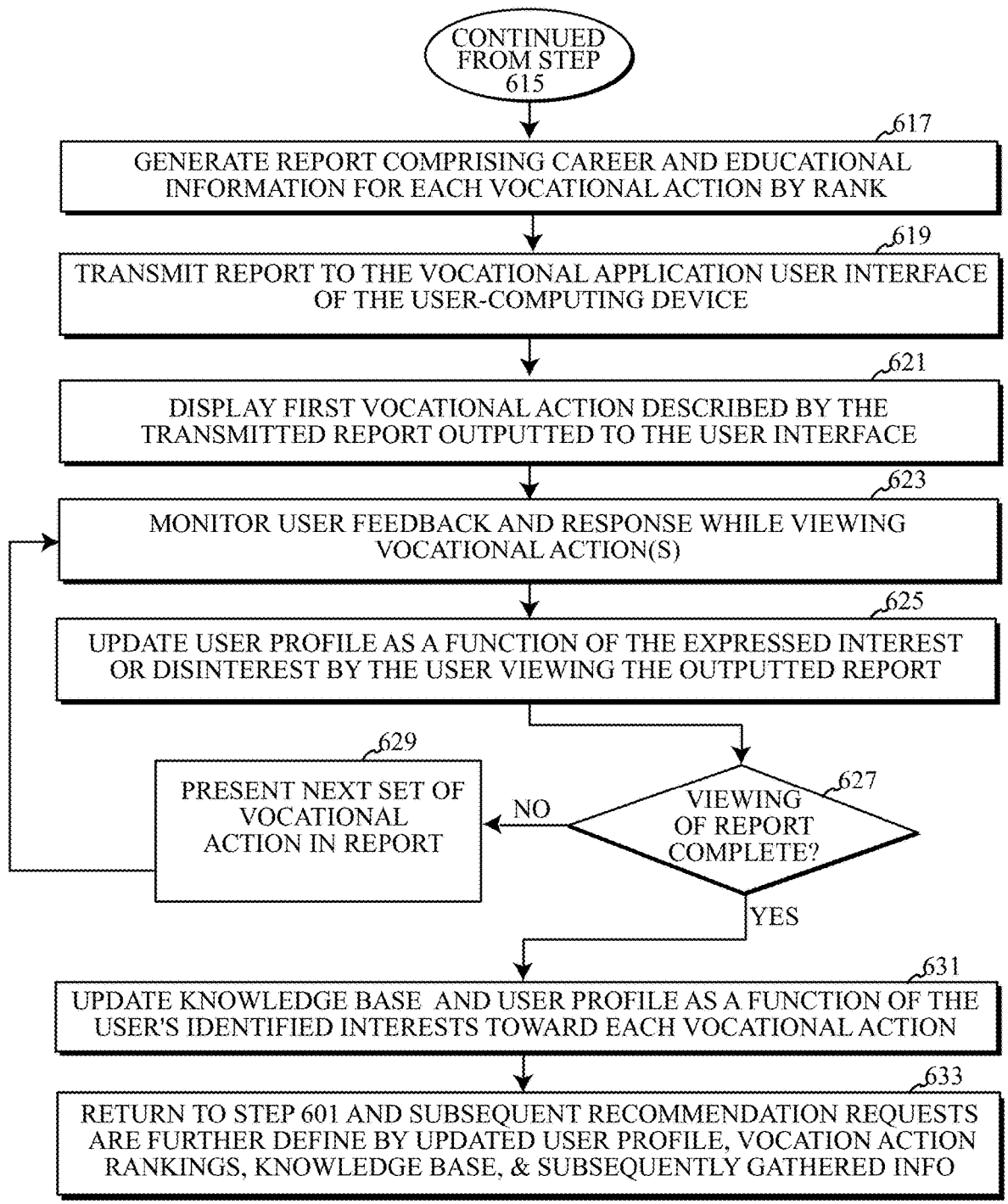

The drawings of FIGS. 6*a*-6*b* represent embodiments of an algorithm 600 for dynamically providing customized career and educational counseling as described in FIGS. 1-5*b* using one or more computer systems as defined generically by computer system 700 of FIG. 7 below and more specifically by the embodiments of specialized computer systems depicted in FIGS. 1-5*b* and as described herein. A person skilled in the art should recognize that the steps of the method described in FIGS. 6*a*-6*b* may be performed in a different order than presented and the methods of FIGS. 6*a*-6*b* may not require all the steps described herein to be performed. Rather, some embodiments may alter the methods by using one or more of the steps discussed below.

FIG. 6*a* represents a flowchart illustrating a first portion of an algorithm 600 for dynamically providing career and education counseling to a user in accordance with the embodiments of the present disclosure. The embodiment of the method 600 may begin at step 601. In step 601, a data gathering module 105 may proceed by collecting user data 130 and user-defined parameters inputted by the user into the vocational application user interface 112. Embodiments of the user data 130 and user-defined parameters may be collected from one or more users who may have provided permissions to vocational application 103 hosted by the server computer 101, to collect user data 130 describing a user's computerized activity, personality, interests, habits, and experiences in order to provide career and educational counseling. Embodiments of the user data 130 may be accessed and gathered from user-accessed data sources 128, client device 110 and other computer systems 700 that may be connected to network 150 of the computing environment 100, 200, 400. Embodiments of user data 130 includes data collected by locally stored or network accessible web sites, services, applications, programs, products and other forms of user data 130 described above and as known to a person skilled in the art. For examples different types of user data 130 is shown in FIG. 4 which includes application data 401, web browser data 403 and messenger service data 405 being collected from client device 110 by the data gathering module 105.

In step 605 of the algorithm 600, the user data 130 and user-defined parameters being gathered by the data gathering module 105 may be inputted into a user profile module 107. The gathered user data 130 may be extracted and analyzed by the user profile module 107, in order to identify one or more descriptive fields and characteristics of the gathered user data 130 and user-defined parameters that may describe the user. Embodiments of the user profile module 107 may define a user profile for the user seeking career and educational guidance from the vocational application 103 based on the extracted user data 130 and user-defined parameters that are analyzed by the user profile module 107. Embodiments of the user profile module 107 may identify and tag keywords and descriptors of the analyzed user data 130. In some embodiments of algorithm 600, step 605 may further comprise the step of defining a user profile by creating a brand-new user profile describing the interests, experiences, activities, habits and personality of the user. In alternative embodiments, the user profile may be defined by matching the interests, experiences, activities, habits, and personality of the user to a pre-defined user profile template that most closely aligns with the user's user data 130 and user-defined parameters.

Embodiments of the algorithm 600 may proceed to step 607. In step 607, the user profile module 107 may match the user profile defined in step 605 based on the user data 130 and user-defined parameters to one or more vocational action that may be predicted to be considered interesting to the user in view of the defined user profile. Matching the user profile to the vocational action may be performed in some embodiments by the user profile module 107 outputting the user profile, including the gathered user data 130 and the user defined parameters to the knowledge base 117. Embodiments of the user profile module 107 may query the records of the knowledge base 117 for known vocations, careers and educational options that may (based on historical data) be identified as a suitable match for the user's profile. The knowledge base 117 may process the query and return one or more vocations, careers and educational options in response to the query. In alternative embodiments where the user profile may be templated from the knowledge base 117 data records, one or more vocations, careers and/or educational options may be pre-associated with the user profile template. Accordingly, by assigning the user profile template to a user, the user profile template may act as an initial starting point for one or more vocations, careers or educational options predicted to be interesting or suitable to the user.

In step 609 of algorithm 600, the user profile module 107 may request the data gathering module 105 to gather vocational data from one or more data sources 120, 124, 128, including career & curriculum data 122 from one or more educational institution data sources 120 and occupational data 126 from one or more occupational data sources 124. Embodiments of the vocational data gathered from each of the data sources 120, 124, 128 may comprise data and metadata in the form of text, images, audio, video, etc. In step 611, the user profile information, the vocational data and/or the user-defined parameters may be stored to the knowledge base 117. Embodiments of the knowledge base 117 may create one or more new records describing the data being received by the knowledge base 117 and the user in some instances. In other instances, one or more records describing the user, the user's profile, and previously collected vocational data may be already compiled into the records of the knowledge base 117. Instead of creating new records, embodiments of the knowledge base 117 may update existing records to accurately reflect the most current user profile, user-defined parameters and vocational data collected by the data gathering module 105.

In step 613 of algorithm 600, embodiments of the knowledge base 117 may input the data stored by the records of the knowledge base 117 into a ranking module 111. Using the inputted records of the knowledge base 117, embodiments of the ranking module 111 may rank each vocational option that may be matched to the user profile based on the expected interest in the options being presented and the user-defined parameters. Each of the options being ranked may be scored or have a probability assigned. The ranking module 111 may organize the ranking of the vocational action from the highest scoring or most probable to interest or be suitable to the user to the least scoring or most probable option to suit the interests of the user. In step 615, the rankings of each option may be returned to the knowledge base 117 and stored by the knowledge base 117. Embodiments of the knowledge base 117 may store the rankings to the knowledge base records associated with the user profile of the current user being counseled by the vocational application 103.

In step 617 of the algorithm 600, the knowledge base 117 or knowledge base management module 109 may request the reporting engine 115 to generate a report comprising a detailed presentation of career, vocation and education options for consideration by the user. Embodiments of the report may organize the presentation of each option being presented to the user based on the rankings calculated by the rankings module 111 in step 615. The size of the report being presented to the user may be controlled by the user or the reporting engine 115 in some embodiments. For example, in some embodiments, the user can limit the number of options being presented to the user by limiting the options to a specified number of those at the top of the rankings. For instance, by limiting the options being presented to the top 5, top 10, top 15 ranked options, etc. In alternative embodiments of the report, the reporting engine 115 may limit the presentation of options to the user. For example, by setting a pre-programmed cutoff in the rankings wherein when an option falls below a certain score, probability or rank, the reporting engine 115 does not include the option in the report. Once the report has been generated by the reporting engine 115, in step 619, the reporting engine 115 may transmit the report to the vocational application user interface 112 which may be displayed on the human readable display 718 of the client device 110 or any other computing system 700 that may be connected to the network 150 of the computing environment 100, 200, 400.

In step 621 of the algorithm 600, the report generated by the reporting engine 115 may be displayed by the vocational application user interface 112. Embodiment of the vocational application user interface 112 may, in step 621 display the first career, vocation or education option described by the report and present the option to the user. In alternative embodiments, the user receiving the report may freely select which option and/or section of the report to view. For example, clicking the career, vocation, or educational option being presented by the report, as shown in the exemplary embodiments of FIGS. 5a-5b. As the user selects and/or reviews one or more sections of the report, in step 623, the vocational application 103 may monitor the user's feedback while viewing the career, vocation and educational options presented. For example, by recording the user's physical or physiological reactions using a recording device 114 or sensor device 116.

In step 625 of the algorithm 600, the feedback data recorded by the recording device 114 and/or sensor device 116 may be collected and analyzed by the analysis engine 113 of the vocational application 103. The analysis engine 113 may identify a user's reaction and expressed interest in one or more options or sections of the report by analyzing feedback data collected, including recorded user gestures, facial expressions, eye movements, eye gaze, vocalized comments or reactions, and physiological indicators of interest or excitement including pupil dilation, heart rate, pulse rate, sweat level, body temperature, or any other measurable physiological characteristic. Based on the analysis of the feedback data collected in step 623 and the conclusions drawn by the analysis engine 113, the user profile module 107 may update the user profile as a function of expressed interests or disinterests expressed by the user for one or more presented options or sections of the report while the user was viewing the information described by the report. The user profile module 107 may redefine or amend the user profile associated with the user to account for the interests or disinterest expressed so that subsequent uses of the vocational application 103 by the user account for the user's previous feedback when future recommendations and reports are presented to the user.

In step 627 of the algorithm 600 a determination may be made by the vocational application 103 whether or not the user has finished viewing the report generated by the reporting engine 115. If the viewing of the report is has not completed, embodiments of the vocational application 103 via the vocational application user interface 112 may proceed to step 629 and continue to present the information provided in the report and/or present the next set of career, vocation or educational options presented by the report. From step 629, the vocational application may return to step 623, wherein the vocational application may continue to monitor the user and collect feedback data from the user as the user continues to review and observe the report. Conversely, in step 627, if the viewing of the report is completed by the user, the algorithm 600 may proceed to step 631. In the embodiments of step 631, vocational application 103 may update the records of the knowledge base 117 as a function of the analysis of the user's feedback and conclusions drawn by the analysis engine in step 623 as well as update the knowledge base 115 in accordance with any changes or modifications to the user profile performed during step 625 of the algorithm 600.

Embodiments of the algorithm 600 may proceed to step 633 wherein the algorithm may return step 601 of the algorithm and any subsequent requests for career, vocational or educations counseling, advice or recommendations by the user may be further defined and influenced by the updated user profile, vocation rankings, knowledge base 117 records. subsequently gathered user data 130 and vocational data to improve the counseling and options presented for each subsequent use of the vocational application 103 by the user Computer System FIG. 7 depicts a block diagram of internal and external components of embodiment of a computer system 700, which may be representative of the one or more computer systems depicted in the computing environment 100, 200 as shown in FIGS. 1-3 in accordance with the embodiments of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 may include communications fabric 702, which provides for communications between one or more processors 703, memory 705, persistent storage 706, communications unit 711, and one or more input/output (I/O) interfaces 715. Communications fabric 702 can be implemented with any architecture designed for passing data and/or controlling information between processors 703 (such as microprocessors, communications and network processors, etc.), memory 705, external devices 717, and any other hardware components within a system. For example, communications fabric 702 can be implemented with one or more buses.

Memory 705 and persistent storage 706 may be computer-readable storage media. Embodiments of memory 705 may include random access memory (RAM) and cache 707 memory. In general, memory 705 can include any suitable volatile or non-volatile computer-readable storage media. Software, such as a vocational application 103 may be stored in persistent storage 706 for execution and/or access by one or more of the respective processors 703 via one or more devices of memory 705.

Persistent storage 706 may include, for example, a plurality of magnetic hard disk drives. Alternatively, or in addition to magnetic hard disk drives, persistent storage 706 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 706 can also be removable. For example, a removable hard drive can be used for persistent storage 706. Other examples include optical and magnetic disks, thumb drives, and smart cards that are inserted into a drive for transfer onto another computer-readable storage medium that is also part of persistent storage 706.

Communications unit 711 provides for communications with other computer systems or devices via a network (e.g., network 150). In the exemplary embodiment, communications unit 711 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 200 or computer system 700 through communications unit 711 (e.g., via the Internet, a local area network or other wide area network). From communications unit 711, the software and data can be loaded onto persistent storage 706.

One or more I/O interfaces 715 may allow for input and output of data with other devices that may be connected to computer system 700. For example, I/O interface 715 can provide a connection to one or more external devices 717 such as one or more internet-of-things devices, recording device 114 such as an audio system, video systems, one or more sensor device(s) 116, input devices such as a keyboard, computer mouse, touch screen, virtual keyboard, touch pad, pointing device, or other human interface devices. External devices 717 can also include portable computer-readable storage media such as, for example, thumb drives, portable optical or magnetic disks, and memory cards. I/O interface 715 may connect to human-readable display 718. Human-readable display 718 provides a mechanism to display data to a user and can be, for example, a computer monitor or screen. Human-readable display 718 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:

anonymizing, by a processor, gathered user data, removing one or more fields identifying a user and scrubbing personally identifying information from the gathered user data;

defining, by the processor, a user profile based on the gathered user data and user-defined parameters; matching, by the processor, the user profile to a vocational option described by a record of a knowledge base using an ontology maintained by the knowledge base, wherein the ontology comprises relationships and properties of existing and known vocational options and the ontology is represented by a graph, with each node of the graph containing parameters, associated with the vocational option; gathering, by the processor, vocational data from one or more data sources for the vocational option matched to the user profile; ranking, by the processor, each vocational option matched to the user profile based on user interests, user personality and the user-defined parameters; generating, by the processor, an interactive report comprising portions containing expandable sections and subsections that are manipulatable by a user, said interactive report compiling a description of each vocational option matched to the user profile and the vocational data gathered from the one or more data sources and includes text images, audio, video or interactive media portions embedded within the interactive report the user navigates to reveal the vocational data gathered from the one or more data sources for the vocational option matched to the user profile; displaying, by the processor, the interactive report to a user for manipulation, as part of an interactive user interface; tracking, by the processor, physical or physiological reactions of the user via a recording device or sensor device during manipulation and navigation of the interactive report by the user via the interactive user interface; and updating, by the processor, the user profile and the ontology based on feedback data describing the physical or physiological reactions of the user recorded by the recording device or the sensor device while viewing the interactive report and adjusting rankings of the vocational option matched to the user profile.

2. The method of claim 1 further comprising the steps of: analyzing by the processor, the physical or physiological reactions of the user to identify interest by the user for each vocational option presented by the interactive report, wherein the physical or physiological reactions are selected from the group consisting of gestures, facial expressions, eye movements, voice patterns and vocal comments of the user.

3. The method of claim 1, wherein defining the user profile further comprises: selecting, by the processor, a pre-defined profile template modeled using the ontology and historical data; assigning, by the processor, the profile template most closely aligned with the gathered user data and the user-defined parameters; and periodically adjusting or changing, by the processor, the pre-defined profile template to another template in response to changes in the gathered user data and the pre-defined user parameters.

4. The method of claim 1, wherein the recording device is selected from the group consisting of a camera, digital recording device, microphone and a combination thereof.

5. The method of claim 1, wherein the gathered user data includes location data collected from global positioning system (GPS) hardware or geographic location services; and inputting, by the processor, into the user-defined parameters a geographic location restriction limiting vocational data from one or more data sources for the vocational option matched to the user profile within a distance from the location data collected by the GPS hardware or the geographic location services.

6. The method of claim 1, wherein the vocational data is selected from the group consisting of course & curriculum data, occupational data and a combination thereof.

7. The method of claim 1, wherein the user data is selected from the group consisting of a messenger application data, social media network data, browser history data, viewed video data, geographical location data, and a combination thereof.

8. A computer system comprising: a processor; and a computer-readable storage media coupled to the processor, wherein the computer-readable storage media contains program instructions executing a computer-implemented method comprising the steps of: anonymizing gathered user data, removing one or more fields identifying a user and scrubbing personally identifying information from the gathered user data; defining a user profile based on the gathered user data and user-defined parameters; matching the user profile to a vocational option described by a record of a knowledge base using an ontology maintained by the knowledge base, wherein the ontology comprises relationships and properties of existing and known vocational options and the ontology is represented by a graph, with each node of the graph containing parameters associated with the vocational option; gathering vocational data from one or more data sources for the vocation matched to the user profile; ranking each vocational option matched to the user profile based on user interests, user personality and the user-defined parameters:

generating an interactive report comprising portions containing expandable sections and subsections that are manipulatable by a user, said interactive report compiling a description of each vocational option matched to the user profile and the vocational data gathered from the one or more data sources and includes text images, audio, video or interactive media portions embedded within the interactive report the user navigates to reveal the vocational data gathered from the one or more data sources for the vocational option matched to the user profile; displaying the interactive report to a user for manipulation, as part of an interactive user interface; tracking physical or physiological reactions of the user via a recording device or sensor device during manipulation and navigation of the interactive report by the user via the interactive user interface; and updating the user profile and the ontology based on feedback data describing the physical or physiological reactions of the user recorded by the recording device or the sensor device while viewing the interactive report and adjusting rankings of the vocational option matched to the user profile.

9. The computer system of claim 8, further comprising the steps of: analyzing the physical or physiological reactions of the user to identify interest by the user for each vocational option presented by the interactive report, wherein the physical or physiological reactions are selected from the group consisting of gestures, facial expressions, eye movements, voice patterns, and vocal comments of the user.

10. The computer system of claim 8, wherein defining the user profile further comprises comprises: selecting a pre-defined profile template modeled using the ontology and historical data: assigning the profile template most closely aligned with the gathered user data and the user-defined parameters; and periodically adjusting or changing the pre-defined profile template to another template in response to changes in the gathered user data and the pre-defined user parameters.

11. The computer system of claim 8, wherein the recording device is selected from the group consisting of a camera, digital recording device, microphone and a combination thereof.

12. The computer system of claim 8, wherein the gathered user data includes location data collected from global positioning system (GPS) hardware or geographic location services; and the program instructions executing a computer-implemented method further comprise inputting into the user-defined parameters a geographic location restriction limiting vocational data from one or more data sources for the vocational option matched to the user profile within a distance from the location data collected by the GPS hardware or the geographic location services.

13. The computer system of claim 8, wherein the vocational data is selected from the group consisting of course & curriculum data, occupational data and a combination thereof.

14. The computer system of claim 8, wherein the user data is selected from the group consisting of a messenger application data, social media network data, browser history data, viewed video data, geographical location data, and a combination thereof.

15. A computer program product comprising: one or more computer readable storage media having computer-readable program instructions stored on the one or more computer-readable storage media, said program instructions executes a computer-implemented method comprising the steps of: anonymizing gathered user data, removing one or more fields identifying a user and scrubbing personally identifying information from the gathered user data; defining a user profile based on the gathered user data and user-defined parameters; matching the user profile to a vocational option described by a record of a knowledge base using an ontology maintained by the knowledge base, wherein the ontology comprises relationships and properties of existing and known vocational options and the ontology is represented by a graph, with each node of the graph containing parameters associated with the vocational option; gathering vocational data from one or more data sources for the vocation matched to the user profile; ranking each vocational option matched to the user profile based on user interests, user personality and the user-defined parameters; generating an interactive report comprising portions containing expandable sections and subsections that are manipulatable by a user, said interactive report compiling a description of each vocational option matched to the user profile and the vocational data gathered from the one or more data sources and includes text images, audio, video or interactive media portions embedded within the interactive report the user navigates to reveal the vocational data gathered from the one or more data sources for the vocational option matched to the user profile; displaying the interactive report to a user for manipulation, as part of an interactive user interface; tracking physical or physiological reactions of the user via a recording device or sensor device during manipulation and navigation of the interactive report by the user via the interactive user interface;

and updating the user profile and the ontology based, on feedback data describing the physical or physiological reactions of the user recorded by the recording device or the sensor device while viewing the interactive report and adjusting rankings of the vocational option matched to the user profile.

16. The computer program product of claim 15, wherein the computer-implemented method further comprises the steps of: analyzing the physical or physiological reactions of the user to identify interest by the user for each vocational option presented by the interactive report, wherein the physical or physiological reactions are selected from the group consisting of gestures, facial expressions, eye movements, voice patterns, and vocal comments of the user.

17. The computer program product of claim 15, wherein defining the user profile comprises: selecting a pre-defined profile template modeled using the ontology and historical data assigning the profile template most closely aligned pith the gathered user data and the user-defined parameters; and periodically adjusting or changing the pre-defined profile template to another template in response to changes in the gathered user data and the pre-defined user parameters.

18. The computer program product of claim 15, wherein the gathered user data includes location data collected from global positioning system (GPS) hardware or geographic location services; and the program instructions executing a computer-implemented method further comprise inputting into the user-defined parameters a geographic location restriction limiting vocational data from one or more data sources for the vocational option matched to the user profile within a distance from the location data collected by the GPS hardware or the geographic location services.

19. The computer program product of claim 15 wherein the vocational data is selected from the group consisting of course & curriculum data, occupational data and a combination thereof.

20. The computer program product of claim 15, wherein the user data is selected from the group consisting of a messenger application data, social media network data, browser history data, viewed video data, geographical location data, and a combination thereof.

* * * * *